United States Patent
Tosato et al.

(10) Patent No.: US 12,267,137 B2
(45) Date of Patent: Apr. 1, 2025

(54) REPORTING CHANNEL STATE INFORMATION (CSI) PRECODING MATRIX INDICATOR (PMI)

(71) Applicant: Nokia Technologies Oy, Espoo (FI)

(72) Inventors: Filippo Tosato, Bures sur Yvette (FR); Rana Ahmed Salem, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 17/730,676

(22) Filed: Apr. 27, 2022

(65) Prior Publication Data

US 2022/0393743 A1     Dec. 8, 2022

Related U.S. Application Data

(60) Provisional application No. 63/230,349, filed on Aug. 6, 2021, provisional application No. 63/187,347, filed on May 11, 2021.

(51) Int. Cl.
    *H04B 7/06*  (2006.01)
    *H04B 7/0456*  (2017.01)

(52) U.S. Cl.
    CPC ......... *H04B 7/0639* (2013.01); *H04B 7/0456* (2013.01); *H04B 7/0634* (2013.01); *H04B 7/0663* (2013.01)

(58) Field of Classification Search
    CPC .. H04B 7/0639; H04B 7/0456; H04B 7/0634; H04B 7/0663; H04B 7/063;
    (Continued)

(56) References Cited

U.S. PATENT DOCUMENTS

| | | |
|---|---|---|
| 2008/0037669 A1 | 2/2008 | Pan et al. |
| 2016/0212643 A1 | 7/2016 | Park et al. |

(Continued)

FOREIGN PATENT DOCUMENTS

| | | |
|---|---|---|
| CN | 105940615 A | 9/2016 |
| CN | 108292942 A | 7/2018 |

(Continued)

OTHER PUBLICATIONS

U.S. Appl. No. 63/173,996, filed 2021.*

(Continued)

*Primary Examiner* — Rushil P. Sampat
(74) *Attorney, Agent, or Firm* — ALSTON & BIRD LLP

(57) ABSTRACT

Described are methods and apparatuses for providing channel state information by receiving configuration information for configuring a measurement window to form a compression matrix of a port selection codebook from a codebook set of vector components, the configuration information defining the size of the measurement window, which is common to all of at least one layer to be reported, selecting a number of indices of the measurement window based on the configuration information to form the compression matrix from the codebook set of vector components, remapping the selected indices, associated to vector components of the compression matrix, with respect to an index of a reference vector component, such that the index of the reference vector component is remapped to a first index of the measurement window, and reporting channel state information including precoding matrix indicator to a network, the precoding matrix indicator comprising information of the compression matrix after remapping.

19 Claims, 15 Drawing Sheets

(58) Field of Classification Search
CPC .. H04B 7/0623; H04B 7/0626; H04B 7/0482; H04B 7/0486
See application file for complete search history.

(56) References Cited

U.S. PATENT DOCUMENTS

| | | | |
|---|---|---|---|
| 2019/0097698 | A1 | 3/2019 | Hosseini et al. |
| 2019/0273537 | A1 | 9/2019 | Rahman et al. |
| 2020/0177249 | A1 | 6/2020 | Ramireddy et al. |
| 2020/0186224 | A1 | 6/2020 | Ahmed Salem et al. |
| 2021/0051508 | A1* | 2/2021 | Chung ............... H04L 5/0048 |
| 2021/0075487 | A1* | 3/2021 | Rahman ............. H04B 7/0626 |
| 2021/0126691 | A1 | 4/2021 | Tosato et al. |
| 2021/0175949 | A1 | 6/2021 | Ahmed et al. |
| 2022/0263560 | A1 | 8/2022 | Cai et al. |
| 2022/0303999 | A1 | 9/2022 | Chung et al. |
| 2022/0352947 | A1* | 11/2022 | Rahman ............. H04B 7/063 |
| 2024/0223254 | A1* | 7/2024 | Hindy ............... H04B 7/0482 |

FOREIGN PATENT DOCUMENTS

| | | |
|---|---|---|
| CN | 110235390 A | 9/2019 |
| CN | 111314034 A | 6/2020 |
| EP | 3 255 813 A1 | 12/2017 |
| EP | 3 780 455 A1 | 2/2021 |
| EP | 4 016 866 A1 | 6/2022 |
| EP | 4 044 444 A1 | 8/2022 |
| EP | 4 099 592 A1 | 12/2022 |
| WO | 2015/060681 A1 | 4/2015 |
| WO | 2016/080734 A1 | 5/2016 |
| WO | WO 2020/063726 A1 | 4/2020 |
| WO | WO 2020/087529 A1 | 5/2020 |
| WO | 2020/182269 A1 | 9/2020 |
| WO | 2020/221581 A1 | 11/2020 |
| WO | WO 2021/023824 A1 | 2/2021 |
| WO | WO 2021/029695 A1 | 2/2021 |
| WO | WO 2021/083068 A1 | 5/2021 |
| WO | WO 2021/090109 A1 | 5/2021 |
| WO | WO 2021/154040 A1 | 8/2021 |
| WO | WO 2022/220631 A1 | 10/2022 |

OTHER PUBLICATIONS

Extended European Search Report received for corresponding European Patent Application No. 22170400.0, dated Oct. 21, 2022, 5 pages.
"Enhancement on CSI measurement and reporting", 3GPP TSG RAN WG1 Meeting #104-e, R1-2101011, Agenda: 8.1.4, Nokia, Jan. 25-Feb. 5, 2021, 21 pages.
"Summary of CSI enhancements for MTRP and FDD (Round 2)", 3GPP TSG RAN WG1 Meeting #104-e, R1-2101886, Agenda: 8.1.4, Huawei, Jan. 25-Feb. 5, 2021, 26 pages.
"Summary of CSI enhancements for MTRP and FDD (Round 4)", 3GPP TSG RAN WG1 Meeting #104-e, R1-2102062, Agenda: 8.1.4, Huawei, Jan. 25-Feb. 5, 2021, 29 pages.
Office action received for corresponding Chinese Patent Application No. 202210511418.3, dated Jul. 27, 2023, 8 pages of office action and no page of translation available.
"On interference measurement and CSI for reciprocity based operation", 3GPP TSG-RAN WG1 NR Ad Hoc #3, R1-1716348, Agenda: 6.2.2.1, Ericsson, Sep. 18-21, 2017, 8 pages.
"Feedback transmission of type II codebook", 3GPP TSG RAN WG1 NR Ad-Hoc#2, R1-1711590, Agenda: 5.1.2.3.4, Nokia, Jun. 27-30, 2017, 6 pages.
"Summary of CSI measurement", 3GPP TSG RAN WG1 Meeting NR #3, R1-1716803, Agenda: 6.2.2.1, ZTE, Sep. 18-21, 2017, 4 pages.
Yuan et al., "A Codebook Based Adaptive Precoding Scheme in 3G LTE Systems", Journal of CAEIT, vol. 6, No. 4, Aug. 2011, pp. 348-352.
Chen et al. "A CSI Acquisition Approach for mmWave Massive MIMO", China Communications, vol. 16, No. 9, Sep. 2019, pp. 1-14.
Decision to Grant for Chinese Application No. 202210511418.3 dated Dec. 15, 2023, 3 pages.
International Search Report and Written Opinion received for corresponding Patent Cooperation Treaty Application No. PCT/FI2022/050277, dated Aug. 8, 2022, 15 pages.
"3rd Generation Partnership Project; Technical Specification Group Radio Access Network; NR; Physical layer procedures for data (Release 16)", 3GPP TS 38.214, V16.5.0, Mar. 2021, pp. 1-171.
Ahmed et al., "Overhead reduction of NR type II CSI for NR Release 16", 23rd International ITG Workshop on Smart Antennas, Apr. 24-26, 2019, pp. 1-5.
"3rd Generation Partnership Project; Technical Specification Group Radio Access Network; NR; Multiplexing and channel coding (Release 16)", 3GPP TS 38.212, V16.6.0, Jun. 2021, pp. 1-153.
"Revised WID: Further enhancements on MIMO for NR", 3GPP TSG RAN Meeting #89e, RP-202024, Agenda: 9.8.1, Samsung, Sep. 14-18, 2020, 5 pages.
"Summary of CSI enhancements for MTRP and FDD (Round 0)", 3GPP TSG RAN WG1 Meeting #104-e, R1-210xxxx, Agenda: 8.1.4, Huawei, Jan. 25-Feb. 5, 2021, 31 pages.
"Summary of CSI enhancements for MTRP and FDD (Round 3)", 3GPP TSG RAN WG1 Meeting #104-e, R1-210xxxx, Agenda: 8.1.4, Huawei, Jan. 25-Feb. 5, 2021, 21 pages.
"RAN1 Chair's Notes", 3GPP TSG RAN WG1 Meeting #105-e, May 10-27, 2021, 57 pages.
"3rd Generation Partnership Project; Technical Specification Group Radio Access Network; NR; Physical layer procedures for data (Release 16)", 3GPP TS 38.214, V16.3.0, Sep. 2020, pp. 1-166.

* cited by examiner

| Index value | $\left[n_{3,l}^{(0)}, n_{3,l}^{(1)}\right]$ |
|---|---|
| 0 | $[0,1]$ |
| 1 | $[0, N_3 - 1]$ |

Fig. 12

| Index value | $\left[n_{3,l}^{(0)}, n_{3,l}^{(1)}, n_{3,l}^{(2)}\right]$ |
|---|---|
| 0 | $[0,1,2]$ |
| 1 | $[0,1, N_3 - 1]$ |
| 2 | $[0, N_3 - 2, N_3 - 1]$ |

Fig. 13

| Index value | $\left[n_{3,l}^{(0)}, n_{3,l}^{(1)}, n_{3,l}^{(2)}, n_{3,l}^{(3)}\right]$ |
|---|---|
| 0 | $[0,1,2,3]$ |
| 1 | $[0,1,2, N_3 - 1]$ |
| 2 | $[0,1, N_3 - 2, N_3 - 1]$ |
| 3 | $[0, N_3 - 3, N_3 - 2, N_3 - 1]$ |

Fig. 14

| Index value | $[f_0, f_1]$ |
|---|---|
| 0 | [0,1] |
| 1 | [1,0] |

Fig. 15

| Index value | $[f_0, f_1, f_2]$ |
|---|---|
| 0 | [0,1,2] |
| 1 | [1,2,0] |
| 2 | [2,0,1] |

Fig. 16

| Index value | $[f_0, f_1, f_2, f_3]$ |
|---|---|
| 0 | [0,1,2,3] |
| 1 | [1,2,3,0] |
| 2 | [2,3,0,1] |
| 3 | [3,0,1,2] |

Fig. 17

REPORTING CHANNEL STATE INFORMATION (CSI) PRECODING MATRIX INDICATOR (PMI)

RELATED APPLICATIONS

This application claims priority from U.S. provisional application No. 63/187,347 filed on May 11, 2021 and from U.S. provisional application No. 63/230,349 filed on Aug. 6, 2021, which are hereby incorporated in their entirety.

TECHNICAL FIELD

The present disclosure relates to methods, apparatuses and computer program products for communicating precoding information between communication devices.

BACKGROUND

Communication sessions can be established between two or more communication devices such as user or terminal devices, base stations/access points and/or other nodes. Communication session may be provided, for example, by means of a communication network and one or more compatible communication devices. A communication device at a network side provides an access point to the system and is provided with an appropriate signal receiving and transmitting apparatus for enabling communications, for example enabling other devices to access the communication system. Communication sessions may comprise, for example, communication of data for carrying communications such as voice, video, electronic mail (email), text message, multimedia and/or content data and so on. Non-limiting examples of services provided comprise two-way or multi-way calls, data communication, multimedia services and access to a data network system, such as the Internet.

In a mobile or wireless communication system at least a part of a communication session between at least two devices occurs over a wireless or radio link. Examples of wireless systems comprise public land mobile networks (PLMN), satellite-based communication systems and different wireless local networks, for example wireless local area networks (WLAN). A user can access the wider communication system by means of an appropriate communication device or terminal. A communication device is often referred to as user equipment (UE) or user device. A communication device is provided with an appropriate signal receiving and transmitting apparatus for enabling communications, for example enabling access to a communication network or communications directly with other users. A communication device may access a carrier provided by a station at a radio access network, for example a base station, and transmit and/or receive communications on the carrier.

A feature of the modern systems is the capability of multipath operation where a communication device may communicate via multiple paths. Multipath communication may be provided by means of an arrangement known as multiple input/multiple output (MIMO).

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called fifth generation (5G) or New Radio (NR) networks. 5G is being standardized by the 3rd Generation Partnership Project (3GPP). The successive versions of the standard are known as Releases (Rel). In a 3GPP 5G NR standardisation work is ongoing to further enhance aspects of MIMO channel state information (CSI).

SUMMARY

Various aspects of examples of the invention are set out in the claims.

According to a first aspect of the present invention, an apparatus, comprising at least one processor and at least one memory including a computer program code, wherein the at least one memory and the computer program code are configured, with the at least one processor, to cause the apparatus to: receive configuration information for configuring a measurement window to form a compression matrix of a port selection codebook from a codebook set of vector components, wherein the configuration information defines the size of the measurement window, which is common to all of at least one layer to be reported; select a number of indices of the measurement window based on the configuration information to form the compression matrix from the codebook set of vector components, wherein the selected indices are associated to vector components of the compression matrix and are common to all of the at least one layer to be reported; and remap the selected indices associated to the vector components with respect to an index of a reference vector component, such that the index of the reference vector component is remapped to a first index of the measurement window; report channel state information including a precoding matrix indicator to a network, the precoding matrix indicator comprising information of the compression matrix after remapping.

According to a second aspect of the present invention, an apparatus, comprising at least one processor and at least one memory including a computer program code, wherein the at least one memory and the computer program code are configured, with the at least one processor, to cause the apparatus to: send configuration information for configuring a measurement window to form a compression matrix of a port selection codebook from a codebook set of vector components, wherein the configuration information defines the number of components of the measurement window, which is common to all of at least one layer to be reported; receive a channel state information report including a precoding matrix indicator comprising information of a compression matrix of a port selection codebook after remapping, wherein, in the remapping, selected indices of the measurement window have been remapped with respect to the index of a reference vector component, such that the index of the reference vector component has been remapped to a first index of the measurement window, wherein the selected indices are associated to vector components of the compression matrix and are common to all of the at least one layer that is reported; and reconstruct precoders based on the precoding matrix indicator.

According to a third aspect of the present invention, a method, comprising receiving configuration information for configuring a measurement window to form a compression matrix of a port selection codebook from a codebook set of vector components, wherein the configuration information defines the size of the measurement window, which is common to all of at least one layer to be reported; selecting a number of indices of the measurement window based on the configuration information to form the compression matrix from the codebook set of vector components, wherein the selected indices are associated to vector components of the compression matrix and are common to all of the at least one layer to be reported; and remapping the selected indices associated to the vector components with respect to an index of a reference vector component, such that the index of the reference vector component is remapped to a first index of the measurement window; reporting channel state information including a precoding matrix indicator to a network, the precoding matrix indicator comprising information of the compression matrix after remapping.

BRIEF DESCRIPTION OF THE DRAWINGS

Some aspects will now be described in further detail, by way of example only, with reference to the following examples and accompanying drawings, in which:

FIGS. 12-17 show examples of index mappings.

DETAILED DESCRIPTION

The following description gives an exemplifying description of some possibilities to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Wireless communication systems provide wireless communications to devices connected therein. Typically, an access point such as a base station is provided for enabling the communications. In the following, different scenarios will be described using, as an example of an access architecture, a 3GPP 5G radio access architecture with MIMO capability. However, embodiments are not necessarily limited to such an architecture. Some examples of possible other systems are the universal mobile telecommunications system (UMTS) radio access network (UTRAN or E-UTRAN), long term evolution (LTE), LTE-A (LTE advanced), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination and further development thereof.

Figure 1:
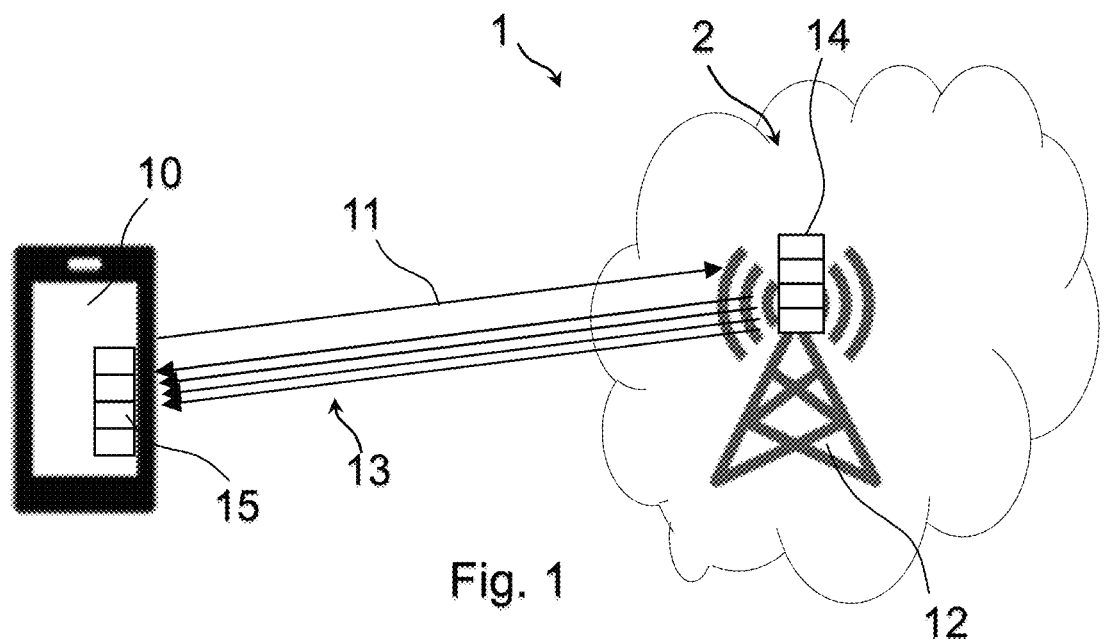
FIG. 1 illustrates an example of a system where the invention can be practiced.

FIG. 1 shows a wireless system 1 comprising a radio access system 2. A radio access system can comprise one or a plurality of access points, or base stations 12. A base station may provide one or more cells. An access point can comprise any node that can transmit/receive radio signals (e.g., a TRP, a 3GPP 5G base station such as gNB, eNB, a user device such as a UE and so forth).

A communications device 10 is located in the service area of the radio access system 2, and the device 10 can thus communicate with the access point 12. The communications 11 from the device 10 to the access point 12 is commonly referred to as uplink (UL). The communications 13 from the access point 12 to the device 10 is commonly referred to as downlink (DL). In the example the downlink is shown schematically to comprise up to four beams per polarization in spatial domain (SD).

It is noted that the wider communication system is only shown as cloud 1 and can comprise a number of elements which however are not shown for clarity. For example, a 5G based system may be comprised by a terminal or user equipment (UE), a 5G radio access network (5GRAN) or next generation radio access network (NG-RAN), a 5G core network (5GC), one or more application functions (AF) and one or more data networks (DN). The 5G-RAN may comprise one or more gNodeB (gNB) or one or more gNodeB (gNB) distributed unit functions connected to one or more gNodeB (gNB) centralized unit functions. The 5GC may also comprise entities such as Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); Session Management Function (SMF) and so on.

The device 10 may be any suitable communications device adapted for wireless communications. A wireless communications device may be provided by any device capable of sending and receiving radio signals. Non-limiting examples comprise a mobile station (MS) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices or any combinations of these or the like. The device may be provided as part of another device. The device may receive signals over an air or radio interface via appropriate apparatus for receiving and may transmit signals via appropriate apparatus for transmitting radio signals. The communications can occur via multiple paths. To enable MIMO type communications device 10 and 12 are provided with multiantenna elements. These are schematically denoted by antenna arrays 14 and 15.

Figure 2:
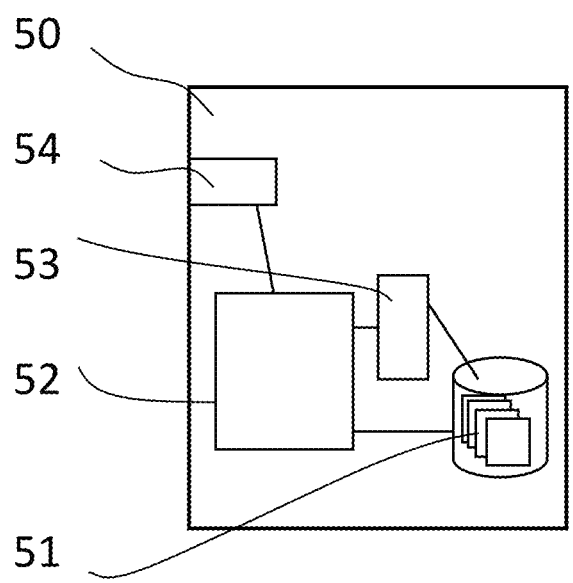
FIG. 2 shows an example of a control apparatus.

A communications device such as the access point 12 or the user device 10 is provided with data processing apparatus comprising at least one processor and at least one memory. FIG. 2 shows an example of a data processing apparatus 50 comprising processor(s) 52, 53 and memory or memories 51. FIG. 2 further shows connections between the elements of the apparatus and an interface for connecting the data processing apparatus to other components of the device.

The at least one memory may comprise at least one ROM and/or at least one RAM. The communications device may comprise other possible components for use in software and hardware aided execution of tasks it is designed to perform, including control of access to and communications with access systems and other communications devices, and implementing the herein described features of positioning of the device. The at least one processor can be coupled to the at least one memory. The at least one processor may be configured to execute an appropriate software code to implement one or more of the following aspects. The software code may be stored in the at least one memory, for example in the at least one ROM.

The following describes certain aspects of measurements, configurations and signaling for multipath, or multibeam wireless transmission related operations using 5G terminology. In Frequency-division Duplex (FDD) based systems, full uplink-downlink (UL-DL) channel reciprocity cannot be assumed due to the duplexing distance between uplink (UL) and downlink (DL) channels. However, a partial channel reciprocity can be assumed based on properties such as angles of departure (AoD), angles of arrival (AoA) and delays of the propagation multipath. UL-DL partial reciprocity properties can be taken into consideration in signalling between communicating devices. For example, a gNB can estimate UL sounding reference signals (SRS) to acquire delay related information, such as frequency domain (FD) components, which may be the same as a UE selection made through DL channel state information reference signal (CSI-RS). The gNB can then use the selected FD components to further precode the beamformed CSI-RS resources already containing spatial domain (SD) beams. CSI-RS ports need to be configured to convey multiple sets of FD components over the CSI-RS. It has been recognised to be possible to enhance MIMO CSI feedback operation by exploiting partial uplink/downlink (UL/DL) reciprocity. Enhancement on CSI measurement and reporting can be based on evaluation and, if needed, specifying port selection codebook enhancement (e.g. based on existing 3GPP Rel.15/16 Type II port selection) where information related to angle(s) and delay(s) are estimated at the gNB based on SRS by utilizing DL/UL reciprocity of angle and delay, and the remaining DL CSI is reported by the UE. This has mainly targeted Frequency Range 1 (FR1) frequency-division duplexing (FDD) to achieve better trade-off among UE complexity, performance and reporting overhead. For example, Type II port selection (PS) codebook was enhanced in 3GPP Rel-16 by introducing frequency-domain (FD) compression operation to the 3GPP Rel-15 Type II port selection codebook. Such enhanced Type II (eType II) port selection (PS) codebook is described for example in section 5.2.2.2.6 of 3GPP TS 38.214 v16.3.0 of September 2020.

3GPP Rel-16 enhanced Type II (eType II) port selection (PS) codebooks (CBs) comprise three codebook components: the port selection matrix ($W_1$), the Discrete Fourier Transform (DFT) based compression matrix ($W_f$), and the combination coefficient matrix ($W_2$). In an example, the grid-of-beam matrix $W_1$ is of size $2N_1N_2 \times 2L$ and provides spatial domain components, a linear combination coefficients (LCC) matrix $W_2$ is of size $2L \times M_v$, while the DFT based compression matrix $W_f$ provides for delay information (each column represents delay tap) and has size $N_3 \times M_v$. Parameter $N_1$ is the number of antenna ports in horizontal domain, $N_2$ is the number of antenna ports in vertical domain, L is the orthogonal vectors/beams per polarization, and $N_3$ is the number of PMI frequency subbands. $M_v$ is the number of frequency domain (FD) components.

The same codebook structure is adopted in the 3GPP Rel-17 further enhanced Type II (FeType II) PS codebook for partial UL-DL channel reciprocity in Frequency Division Duplex (FDD) operation. The following gives an overview of differences in reporting mechanism for the compression matrix ($W_f$) in FeType II PS compared to the eType II PS codebook and potential consequences thereof.

In 3GPP Rel-16 the network configures the number $M_v$ of DFT vectors that form the compression matrix $W_f$, which depends on the reported rank v, by configuring a parameter combination pararnCombination-r16. $M_v$ components can be understood to denote frequency domain (FD) bases or components. More generally, this parameter comprises appropriate vectors or components. In the appended Figures the components are defined by the X-axis to denote the DFT-transformation of the frequency domain. The components correspond to channel delays, so the domain can also be called "delay domain". A UE can then select $M_v$ vectors of length $N_3$ from a DFT-codebook, for each layer, where $N_3$ is the number of Precoding Matrix Indicator (PMI) subbands, which equals the size of the DFT codebook. The selection is done separately for each layer, and hence each $W_f$ is considered layer-specific. The UE selects these DFT vectors from the whole codebook set of $N_3$ vectors, if $N_3 \leq 19$, whereas it is restricted to select the vectors from a window of size $N=2M_v$, if $N_3 \geq 19$. In the window mechanism, a UE chooses the best position for the window, provided that component 0 is included in the window and the window position is common for all layers. In practice, the UE selects and reports the initial component of the window, $M_{initial} \in \{-N+1, -N+2, \ldots, 0\}$. Note that a negative value of $M_{initial}$ means that the window wraps around the set of $N_3$ components, i.e., all candidate components are represented modulo $N_3$.

A design principle in the reporting of $W_f$ in 3GPP Rel-16 is that the strongest coefficient for each layer is found in the first column of the bitmap associated to the nonzero coefficients of $W_2$, which corresponds to component 0. $W_2$, is reported using a bitmap of size $K_1 \times M_v$, the bitmap indicating the position of reported nonzero coefficients and the amplitudes and phases of the coefficients being reported in sequence following the bitmap indication, where $K_1 \leq P$ is the number of CSI-RS ports that a UE is configured to select. This is ensured by the UE configured to apply two cyclic shifts for each layer l: a first cyclic shift, $$-n_{3,l}^{(f_l^*)},$$

is applied modulo $N_3$ to all $M_v$ components of $W_f$ for a given layer, such that the component of the strongest coefficient is moved to position 0. A second cyclic shift, $-f_l^*$, which is related to the first, is applied modulo $M_v$ to the columns of $W_2$, i.e., to the bitmap of size $2L \times M_v$ and the corresponding order in which the amplitude and phase coefficients are reported. Note that $f_l^* \in \{0, 1, \ldots, M_v-1\}$ is the column index of the strongest coefficient of $W_2$ before the shift, whereas $$n_{3,l}^{(f_l^*)}$$

is the FD component index of the strongest coefficient before the shift. After these cyclic shifts, a UE reports the nonzero $M_v-1$ components of $W_f$ relative to component 0, which is, after the shift, the component of the strongest coefficient. A UE also reports $W_2$ after the shift, such that the columns of $W_2$ correspond to the $M_\nu$ components of $W_f$ in increasing order of their index: the first column of $W_2$ corresponds to component 0 (component of the strongest coefficient after the shift), the second column of $W_2$ corresponds to the first reported component of $W_f$, the third column of $W_2$ corresponds to the second reported component of $W_f$, etc. The gNB does not need to know the $f^*_l$ because the first cyclic shift is applied to the components of $W_f$ before reporting. This principle exploits a property of the precoder vectors indicated by a Precoding Matrix Indicator (PMI), whose performance is not affected by a cyclic shift of the components in $W_f$.

In accordance with 3GPP Rel-16 the position of the strongest coefficient in the matrix $W_2$ is reported for each layer because it serves as amplitude reference for the other nonzero coefficients in $W_2$. The reported position can comprise only the row index because the gNB can assume the column to be the first column. $W_2$ is layer specific. The gNB receiving the report can thus expect the strongest coefficient to be in component 0, i.e., the first column of $W_2$, and thus the strongest coefficient indicator (SCI) only indicates the beam index, i.e., row index of $W_2$ corresponding to its location. In practice, the window mechanism used in 3GPP Rel-16 for $N_3>19$ works such that the UE shifts the component of the strongest coefficient for each layer to position 0, then determines the best value of $M_{initial}$, common for all layers, and then selects different $M_\nu$ components for each layer within a length-N component window starting from $M_{initial}$. In this way, all $M_\nu$ components for each layer, after the cyclic shift $$n_{3,l}^{(f_l^*)},$$

fall within the reporting window starting from $M_{initial}$.

$W_f$ can also be assumed to be layer common. In such case, the proposed indicators such as $M_{initial}$ or position of the strongest coefficient can be layer common.

For the FeType II PS codebooks the current agreement is that the $M_\nu$ components, a.k.a., frequency domain (FD) bases, are limited within a single window/set of size N. At least for rank 1, the FD bases used for $W_f$ quantization are limited within a single window/set with size N configured to the UE. It has been proposed that the FD bases in the window must be consecutive from an orthogonal DFT matrix. An alternative proposal is that FD bases in the set can be consecutive/non-consecutive and are selected freely by gNB from an orthogonal DFT matrix. Other conditions such as, e.g., whether $W_f$ can be turned ON/OFF and/or associated value of $M_\nu$ and whether this applies when $W_f$ is turned OFF are still open. A measurement window configured by the gNB may restrict the selection of the $M_\nu$ vectors of $W_f$, and is layer common. Further, it is unclear and may have different interpretations. For example, the window may be used to limit the maximum separation between the $M_\nu$ components for each layer for $M_\nu>1$. Note that this is different from the window in Rel-16 PS for $N_3>19$, where the window IntS, of size $2M_\nu$, is layer common, hence it limits the max separation between selected components across all layers after aligning the components of the strongest coefficient. Another possible interpretation is that the window configures a set of DFT vectors for measurement of $W_2$, i.e. a UE is configured to measure (at least) the DFT vectors in the window (but it may measure more) and select $M_\nu$ components that span at most N components, i.e., they fit within the configured window, after an appropriate shift, if needed. Note that a UE may calculate more than N components and chose the best $M_\nu$ outside the configured measurement window comprising FD components from 0 to N−1, provided that the selected components fits within the window after a common cyclic shift to all $M_\nu$ components. In fact, two different selections of $W_f$ obtained from one another by a cyclic shift produce different $W_2$ but they can be reported as the same $W_f$ without affecting the precoder performance.

Two further alternatives are possible regarding the relationship between parameters N and $M_\nu$. The candidate values for $M_\nu$ in Rel-17 are smaller than in Rel-16 with only 1, 2 (and possibly 4) being considered. The Rel-17 window/set size is also smaller compared to Rel-16 with most likely candidate values being also 1, 2 3 and 4. At least for rank 1, it has been proposed for relationship between N and $M_\nu$ that $N=M_\nu$, or that $N\geq M_\nu$. Candidate value(s) of N are under study, but may be, e.g., 2, 4.

A difference between the window/set mechanism in Rel-17 from that of Rel-16 is that the choice of window/set is done by the gNB, instead of the UE by exploiting partial reciprocity of delays between UL and DL channel in FDD operation. However, the position of the strongest coefficient in each layer is determined at the UE because the fast fading components of the channel are not reciprocal. Therefore, if the same design principle as Rel-16 is reused meaning that a gNB expects the strongest coefficient in the first column of $W_f$, it is possible that a UE shifts the $M_\nu$ components outside the configured window.

Figure 3:
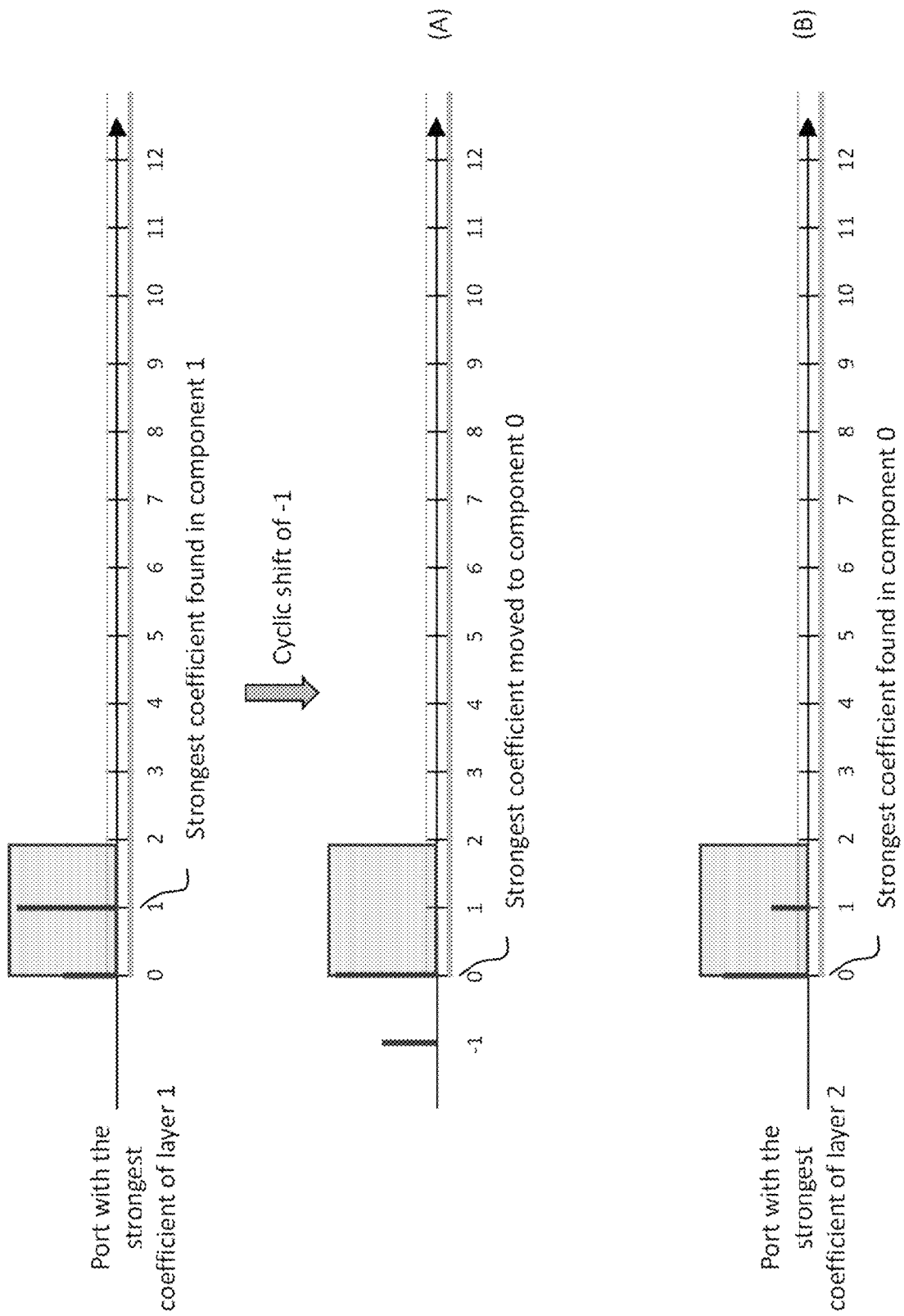
FIG. 3 is an example of frequency domain (FD) components being out-of-reporting window.

Such out-of-window problem may occur in Rel-17 port selection (PS) codebook design, e.g., for configurations of $W_f$ with $M_\nu>1$. To illustrate consider an example with parameter combination N=M=2 where the window is formed by two consecutive Digital Fourier Transform (DFT) components, 0 and 1. FIG. 3 shows the frequency domain (FD) components and the network configured window of size N=2 for two layers. For each layer, the vertical bars correspond to the $M_\nu=2$ FD components. The bar height illustrates the amplitude of the combination coefficients of $W_2$ for the port with the strongest coefficient in each layer. It is noted that each layer consists of $K_1\leq P$ ports selected by the UE out of the total P CSI-RS ports and therefore the size of matrix $W_2$ is $K_1\times M_\nu$, for each layer. It is also noted that the $M_\nu$ components are common for all ports in a layer and, in this case, for all layers, i.e., they are layer common. However, FIG. 3 only illustrates the amplitudes of the $M_\nu$ coefficients for the port where the strongest of the $K_1M_\nu$ coefficients is found.

For layer 1, the strongest coefficient is found in component 1 of a port, hence a cyclic shift of −1 is applied, modulo $N_3=13$, to move the FD component of the strongest coefficient to component 0, by reusing the same design principle as in Rel-16 PS. The shift is cyclic because component 0 is shifted to −1, which corresponds to component −1 mod 13=12, whilst component 1 is shifted to component 0. For layer 2, the strongest coefficient is found already in component 0, hence there is no need for a shift. After the shift on layer 1, one component has moved outside the window configured by the gNB, this being shown in a possible scenario for layer 1 (A). In a possible scenario for layer (B) both components are inside the window. Because of the difference a UE needs to signal one of the two combinations to the gNB for each layer.

Reusing indicators defined in Rel-16 CB without modifications is not possible in Rel-17. In fact, the indicator $i_{1,5}$ (layer-common $M_{initial}$) defined in the window mechanism of Rel-16 regular and port selection CBs is layer-common and it is not possible to find a position of the window that is common for both layers in FIG. 7. The indicator $i_{1,6,l}$ (layer-specific $W_f$) is also not suitable, because, if the window size N=2 is replaced in the definition of $i_{1,6,l}$, a single codepoint for $W_f$ is obtained, as follows:

$$i_{1,6,l} \in \left\{0, 1, \ldots, \binom{N-1}{M_v-1}-1\right\} = \{0\}. \quad (1)$$

This does not allow to distinguish the two combinations in (A) and (B).

Therefore, by reusing the indicators for $W_f$ defined in Rel-16 when $W_f$ is limited within a window of size N, in the case of FIG. 3 there is no reporting of $W_f$, but the gNB would not be able to distinguish between the two $W_f$ for layer 1 (A) and layer 2 (B).

The out-of-window issue illustrated in (A) of 3 might be avoided by not following the Rel-16 design principle that the strongest coefficient is found on the first column of $W_2$. The component of the strongest coefficient could then be any of the $M_v$ components. However, this approach would require cumbersome changes of the omission rules for Uplink Control Information (UCI) mapping of the PMI in part 2 of the CSI report would need changing. UCI omission is a mechanism for the UE to drop part of the PMI payload when the Physical Uplink Shared Channel (PUSCH) resource is not enough to accommodate the full report. Omission rules for Rel-16 Type II CBs are designed to assign higher priority value, Pri(l,i,f), to the first column of $W_2$, such that $W_2$ can be split in two parts assigned to different priority groups such that the strongest coefficient for each layer is less likely to be omitted. If the strongest coefficient can be in any of the $M_v$ components, the probability of omitting the strongest coefficient increases, which can impact performance in case omission occurs.

The following discusses in more detail examples for a reporting window for $W_f$ and a measurement window for the $W_f$. The reporting window can be configured by a network entity, for example by the gNB and the UE can be configured accordingly. The size of the reporting window can be defined in different ways, examples for this being explained in detail below.

Figure 4:
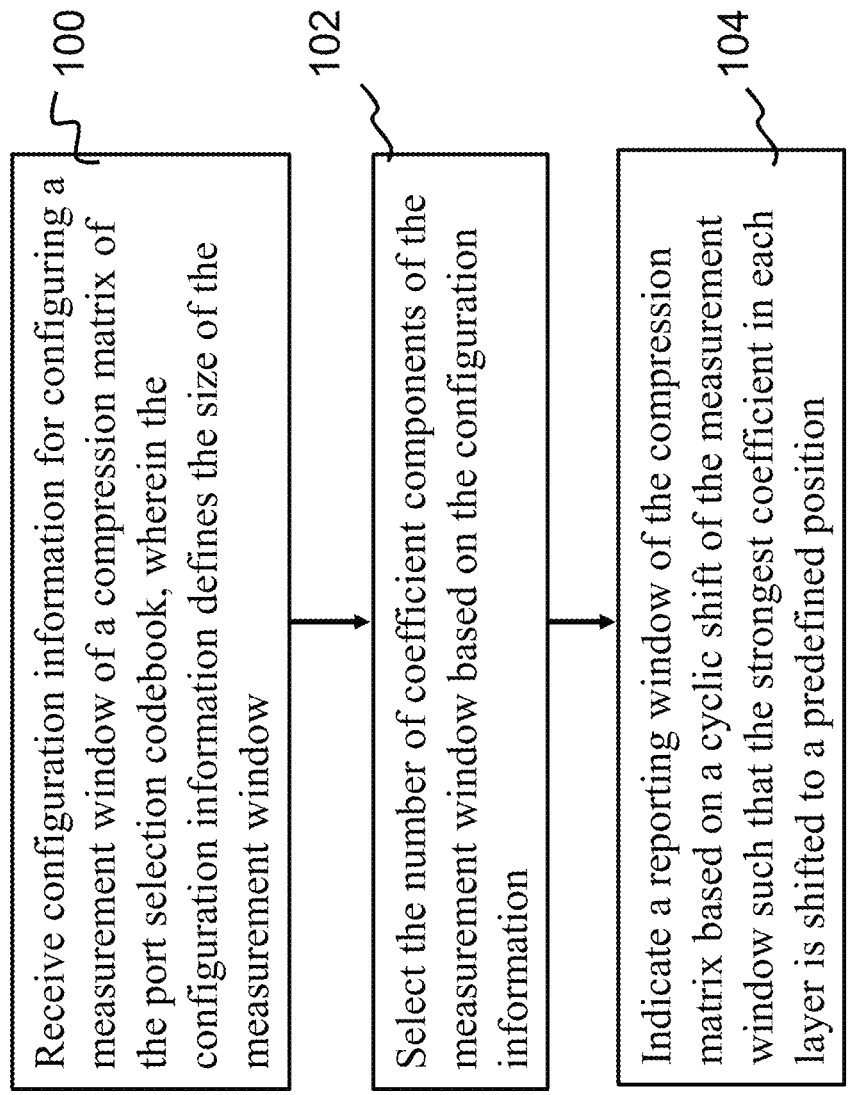
FIGS. 4 and 5 are flowcharts according to certain examples.

FIG. 4 shows a flowchart of an example for operation of a device receiving and using the configuration information, for example the device 10 of FIG. 1. In the method a precoding matrix indicator for a channel state information report configured with a port selection codebook is provided such configuration information for configuring a measurement window of a compression matrix of the port selection codebook, the configuration information defining the size of the measurement window, is received at 100. The device can then select the number of components of the measurement window based on the configuration information at 102. A reporting window of the compression matrix is indicated at 104 based on a cyclic shift of the measurement window, such that the strongest component in each layer is shifted to a predefined component position. According to an example the strongest component is shifted to the component of index 0.

Figure 7:
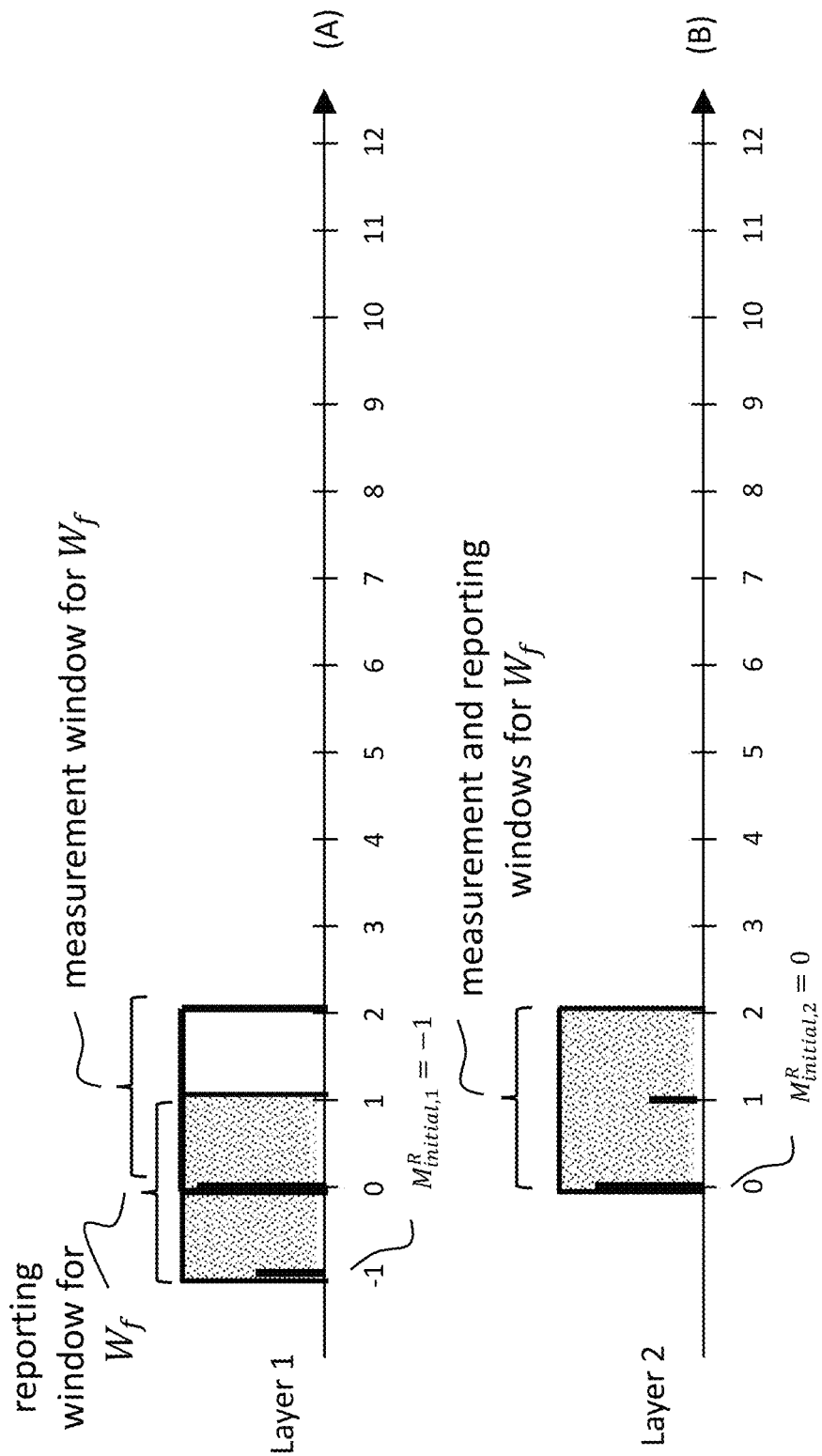
FIGS. 7 and 8 illustrate measurement and reporting windows configured according to two examples.

A more detailed example of sending layer specific indications of the initial position is shown in FIG. 7.

Figure 8:
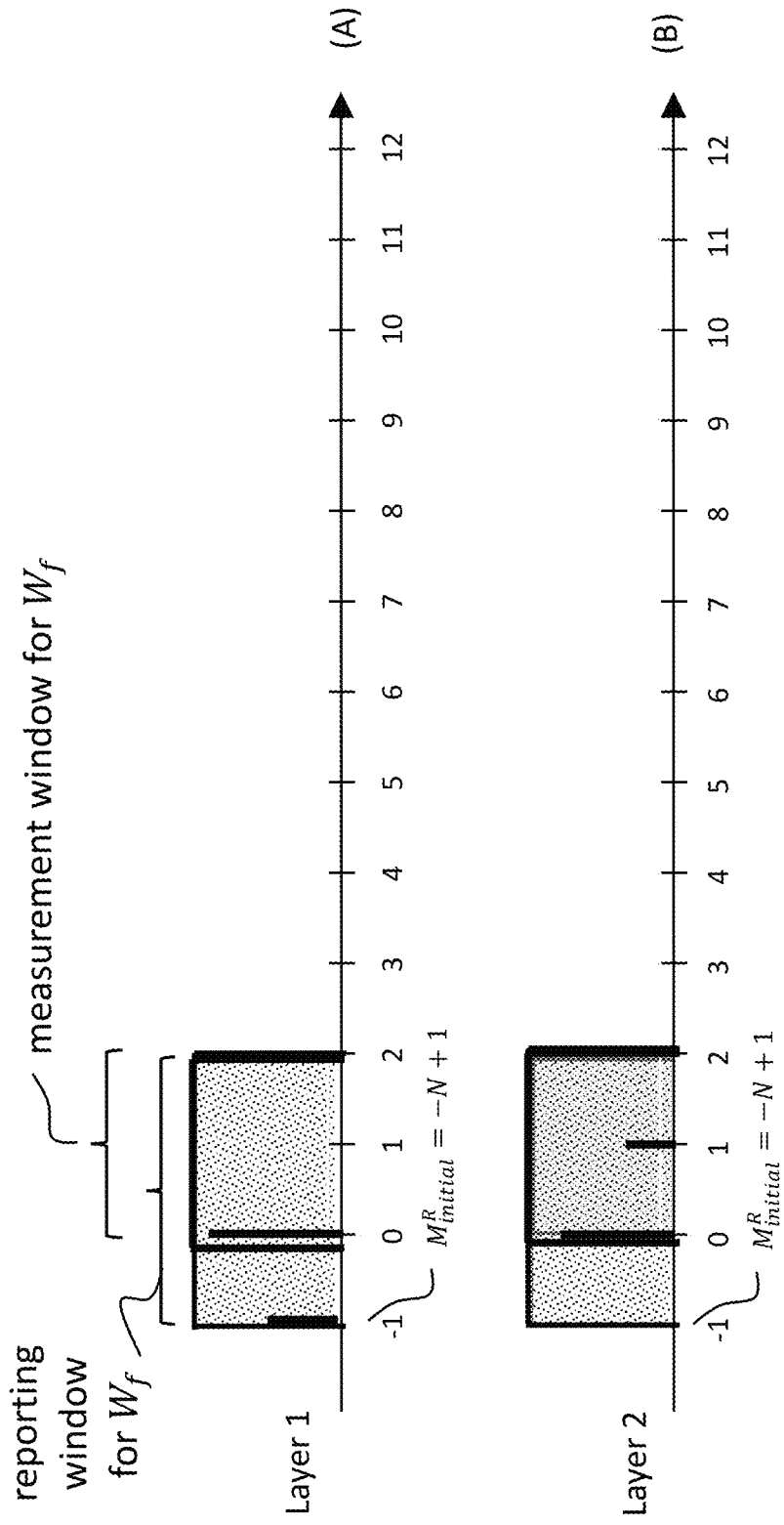

According to a possibility the reporting window is configured as an extension of the measurement window. An example of this is shown in FIG. 8 where the extension is fixed without need to report an indication of the reporting window. In this case the operation in block 104 of FIG. 4 would comprise use of a received configuration of a reporting window defining an extension of the measurement window such that the frequency domain component of the strongest coefficient in each layer is shifted to a predefined component position. For example, the strongest component is shifted to the component position of index 0.

Figure 5:
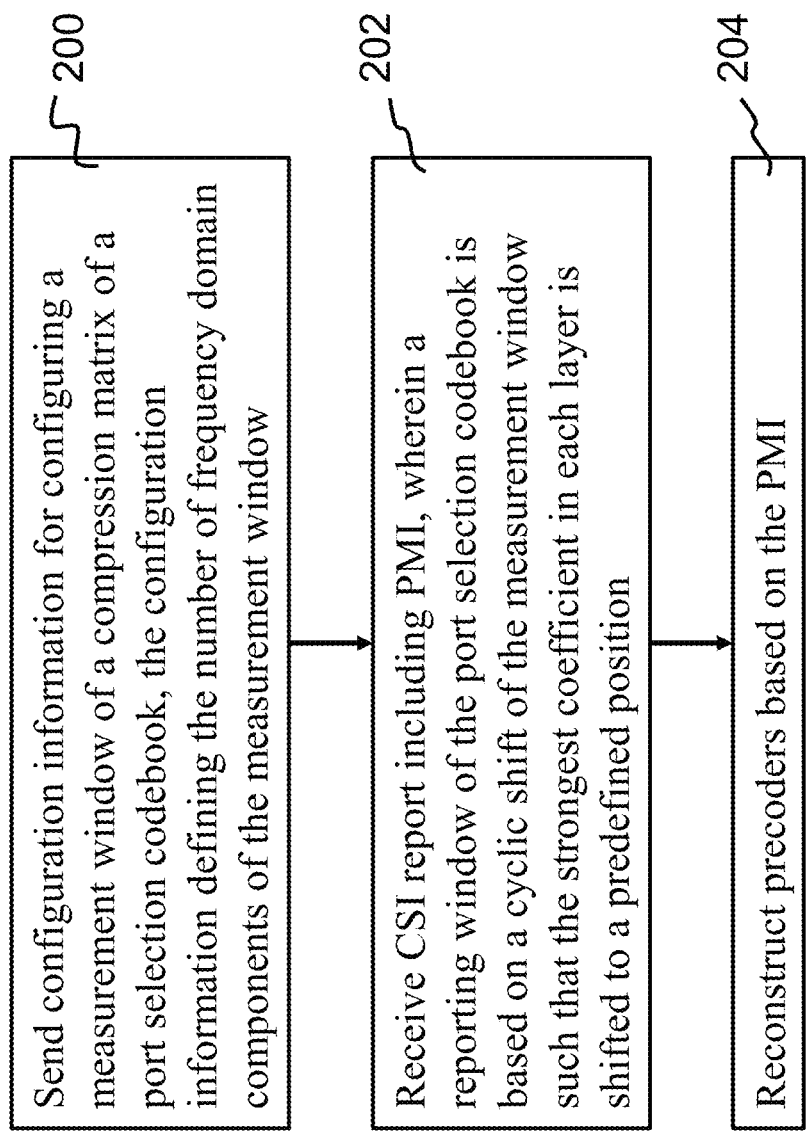

FIG. 5 shows a flowchart of an example for operation at a device provided in an access network, for example the access point 12 of FIG. 1, for configuring a device for signalling information in relation to multichannel communications. In the method the device sends at 200 configuration information for configuring a measurement window of a compression matrix of a port selection codebook. The configuration information defines the number of frequency domain coefficient components of the measurement window. A channel state information report including the precoding matrix indicator is then received 202. A reporting window of a port selection codebook is received based on a cyclic shift of the measurement window such that the frequency domain component of the strongest coefficient in each layer is shifted to a predefined component, for example the component of index 0. The device can then reconstruct precoders based on the precoding matrix indicator at 204.

According to an alternative, instead of cyclic shifting, the reporting window is configured as an extension of the measurement window. An example of this is shown in FIG. 8.

More detailed examples for possible ways for use of the clustered precoding are given in the following.

Figure 6:
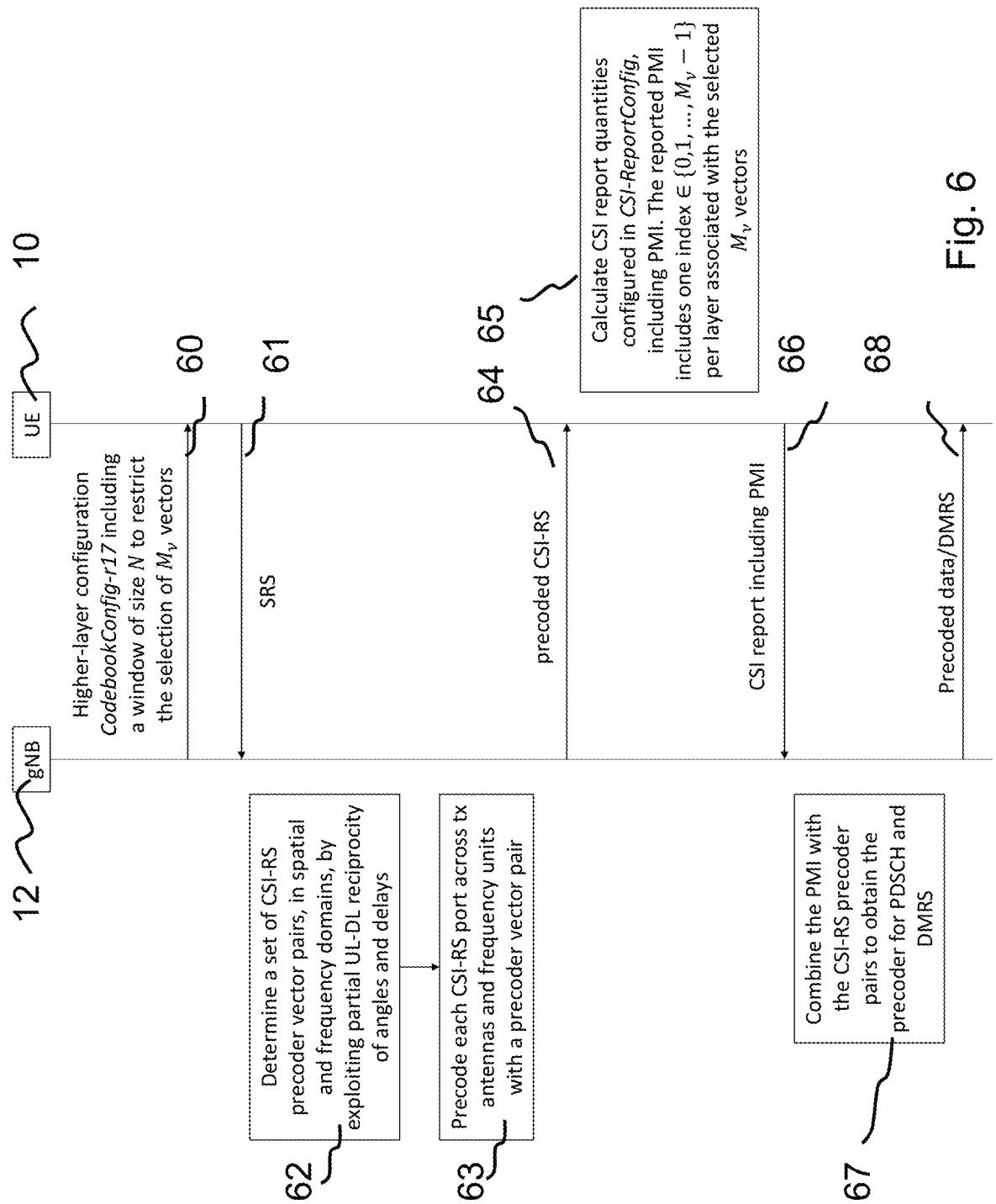
FIG. 6 is a signaling flow chart between two communication devices according to an example.

FIG. 6 shows a signalling flowchart in accordance with an example between two communication devices, and more particularly between an UE 10 and a gNB 12, for port selection codebook configuration, measurement and reporting where a specific window size is communicated to the UE. More particularly, the gNB 12 sends message 60 to the UE, the message including a higher layer configuration including a window side parameter N to restrict the selection of $M_v$ vectors. In the example the configuration is shown to comprises element 'CodebookConfig-r17'.

The UE can respond with a sounding reference signal (SRS) 61 whereafter the gNB can determine at 62 a set of CSI-RS vector pairs, in spatial and frequency domains. The gNB can exploit partial UL-DL reciprocity e.g. as explained above. Each CSI-RS port is then precoded at 63 across transmission (tx) antennas and frequency units with a precoder vector pair. The precoded CSI-RS is communicate to the UE by message 64.

The UE can now calculate at 65 CSI report quantities configured e.g. in 'CSI-ReportConfig' including the PMI. The PMI reported by message 66 can include one index per layer associated with the selected $M_v$ vectors. The gNB can then combine at 67 the received PMI with the CSI-RS precoder vector pairs determined at 62 to obtain the precoder for the Physical Downlink Shared Channel (PDSCH) and Demodulation Reference Signal (DMRS). Precoded data and the DMRS can then be signalled to the UE at 68.

The following explains in more detail, by way of examples, an enhanced codebook arrangement for signalling port selection channel state information (PS CSI) where UE reports a Precoding Matrix Indicator (PMI) in a channel state information (CSI) report configured with port selection codebook in which $M_v$ DFT-based vectors of $W_f$ are restricted in a configured measurement window of size N and the strongest coefficient in each layer is expected to be located in the first column of the bitmap of the reported nonzero coefficients of $W_2$. The gNB can then reconstruct the precoders from the PMI. One or more indices of the PMI are associated to a reporting window for $W_f$, which can be different from the configured measurement window.

This can be particularly relevant in the context of frequency domain (FD) compression operations. In certain applications compression operations can be moved, at least partially or in most part, from the UE to the gNB. The enhancement is based on assumption of partial reciprocity of cluster delays in the UL and DL channels and flexibility in use of frequency domain components.

A first example is illustrated in FIG. 7. The $M_v-1$ nonzero components, if reported, are indicated with respect to the reporting window. The reporting is based on a layer-specific reporting window of size N and initial point $M_{initial,l}^R \in \{-N+1, -N+2, \ldots, 0\}$, for layer $l=1, \ldots, v$.

One index can be reported per layer. The index can correspond to the cyclic shift needed to move the component of the strongest coefficient to a predefined component, preferably 0. The measurement window configured by the gNB restricts the selection of the $M_v$ vectors of $W_f$ and is layer common. The reporting window can be a layer-specific shifted version of the layer common measurement window. The reporting window can be obtained based on the configured measurement window by applying the cyclic shift such that the component of the strongest coefficient is moved to component 0 and an index is then reported to the gNB indicating the shift for each layer.

The $M_v$ components can be configured to be consecutive. The index associated to the reporting window can correspond to the component of the strongest coefficient inside the configured measurement window. A cyclic shift of −index ("a cyclic shift to the left of index") can be applied modulo $M_v$ by the UE to the columns of the $W_2$, before reporting, including the bitmap of reported nonzero coefficients and the corresponding indices of the amplitudes and phases of these nonzero coefficients, such that the strongest coefficient is moved to the first column. The UE can be configured not to report $M_v-1$ nonzero components. A cyclic shift of a negative integer value, denoted as −index above, applied to a component x modulo y is a circular shift to the left, i.e. it subtracts index from x and is expressed by the operation: (x−index) mod y. Conversely, a cyclic shift of a positive integer value, index is expressed by the operation: (x+index) mod y.

A second example is based on a layer-common reporting window of size 2N−1 and fixed initial point $M_{initial}^R=-N+1$, as shown in FIG. 8. The reporting window can be obtained from the configured measurement window by extending the measurement window on one side with additional N−1 consecutive components. As above, $M_v-1$ nonzero components, if reported, are indicated with respect to the reporting window.

Figure 9:
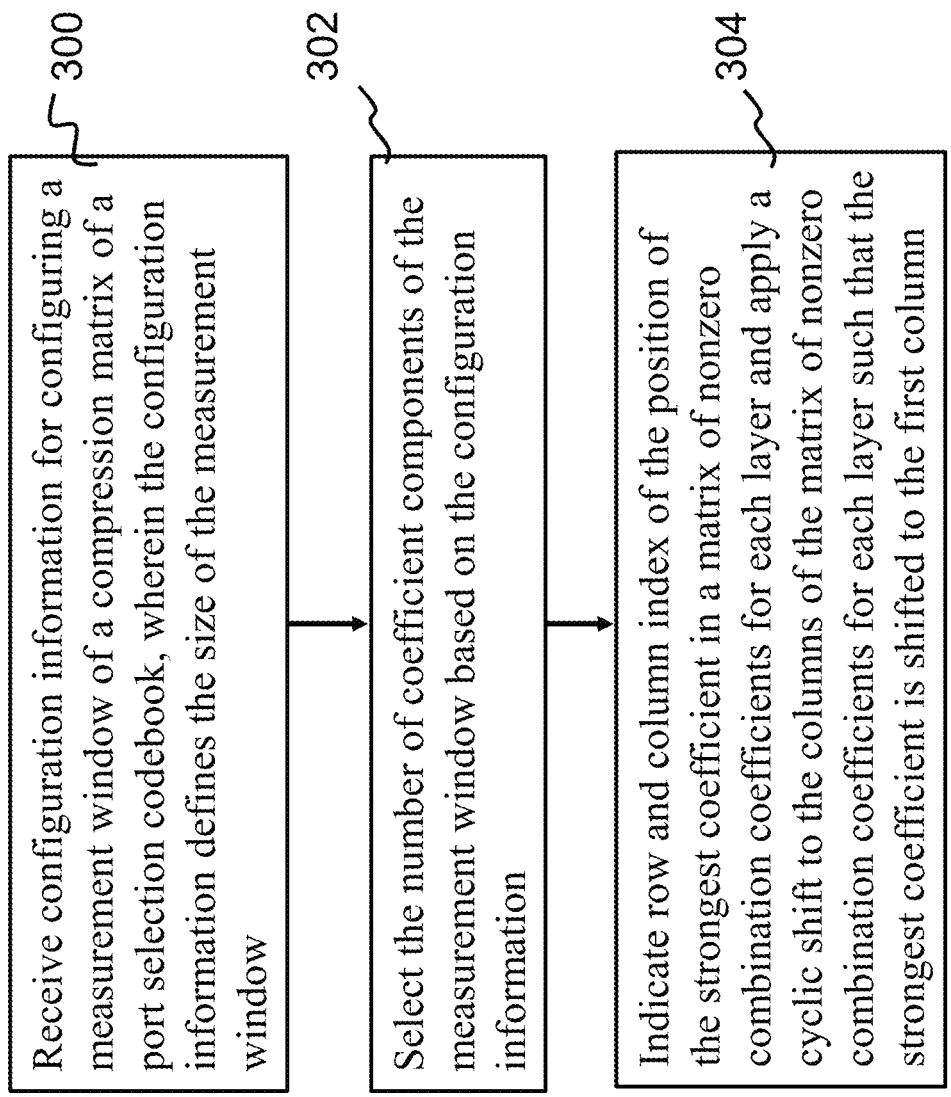
FIGS. 9 and 10 are flowcharts according to further examples.
Figure 10:
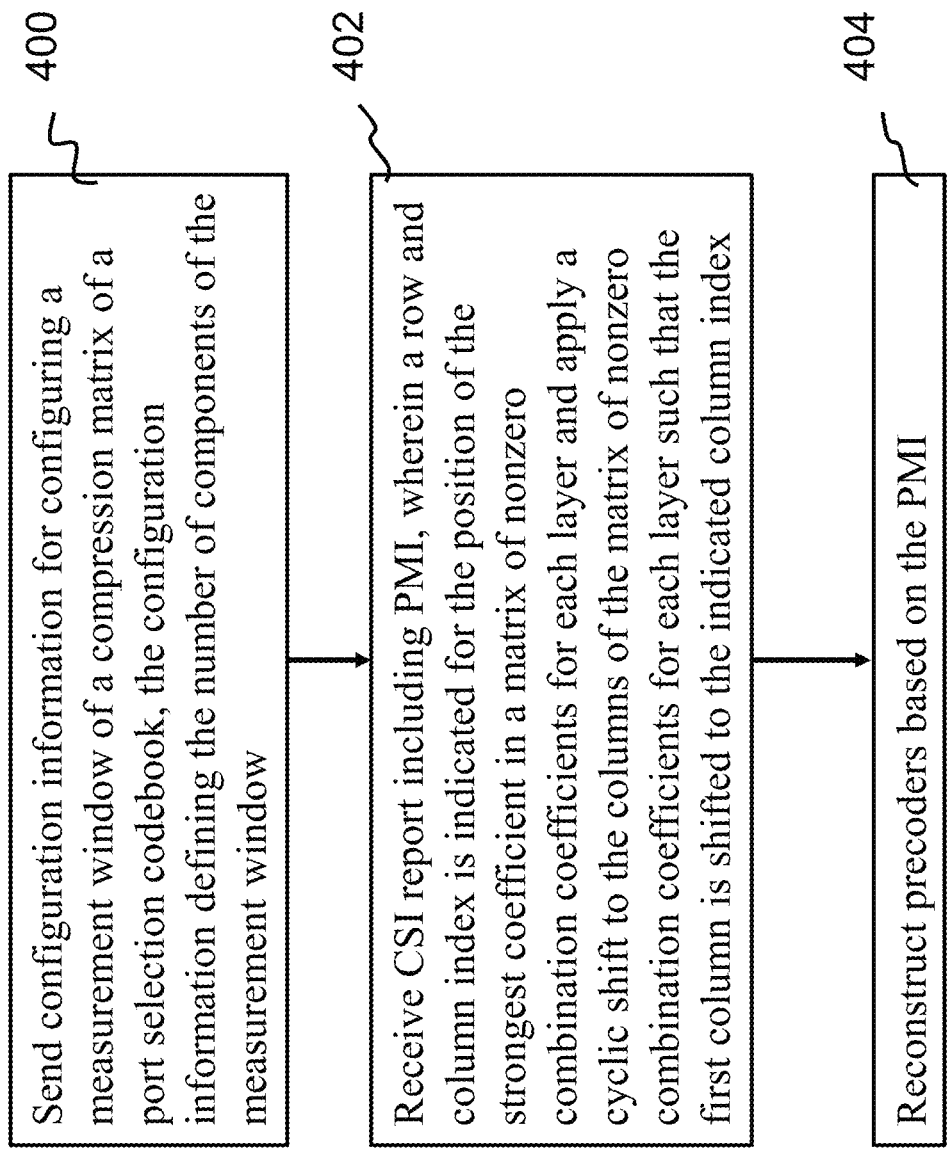
Figure 11:
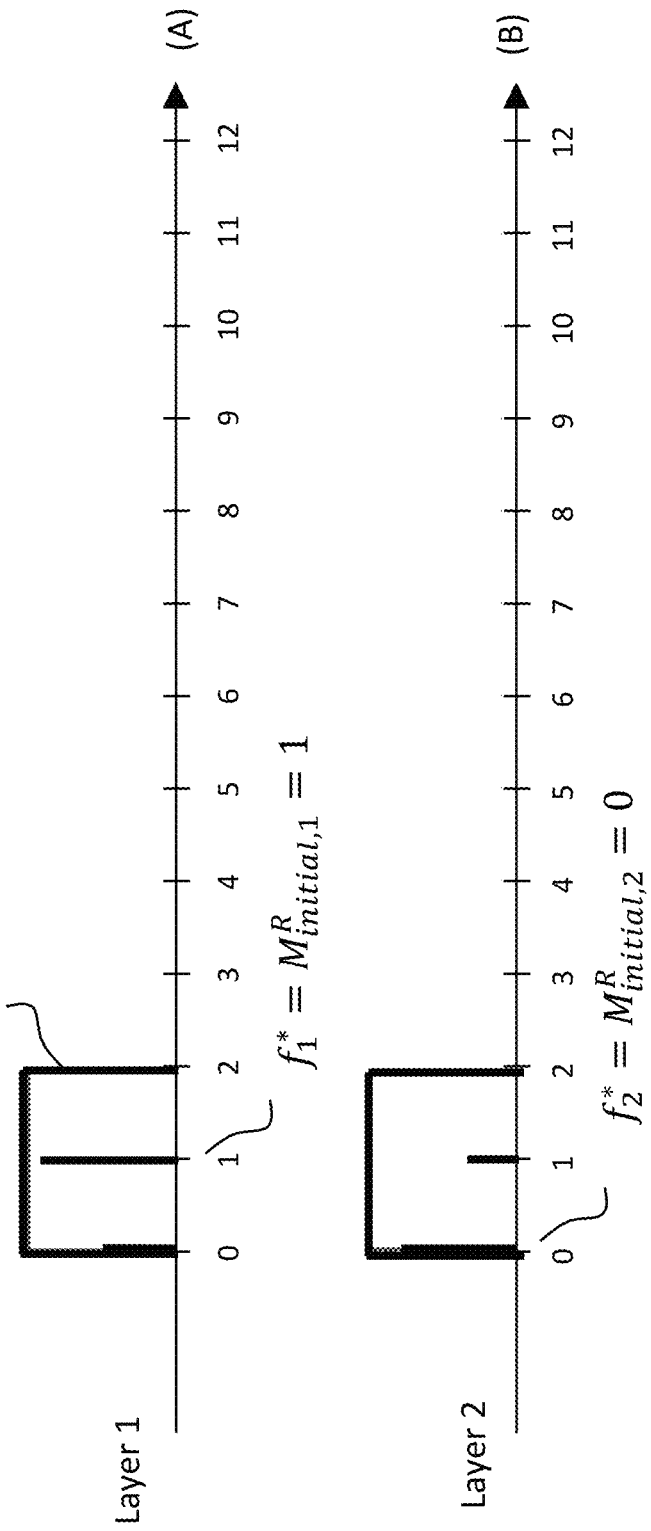
FIG. 11 is another example of measurement and reporting windows.

It is possible that the strongest component is already on the first component position (component 0 in FIGS. 7 and 8). In such case the UE may selectively use a reporting window that corresponds the measurement window. In accordance with an example a UE can be configured to be capable of determining if the strongest tap on any of the layers is on a different component that the first component and in response thereto selectively apply changes to the reporting window from the measurement window. If needed, the UE may selectively indicate the changes to the gNB. FIGS. 9, 10 and 11 relate to an example where the measurement window size and position as such is kept. Instead, the UE takes another action in view of the strongest components, as will be explained in more detail later in his specification.

In a more specific configuration, applicable for example to 3GPP Rel-17 type port selection (PS), and where $N=M_v=2$, examples of FIGS. 7 and 8 enable reporting of a binary index per layer. In other possible configurations with $N=M_v>2$ or $N>M_v\geq 2$ and an additional constraint that the $M_v$ components must be consecutive, the example of FIG. 7 can be more efficient in terms of signalling overhead compared to the second example. It should also be noted that, in these cases the first example can also be described as reporting an index $f_l \in \{0, 1, \ldots, M_v-1\}$ for each layer $l=1, \ldots, v$, corresponding to the component of the strongest coefficient before the cyclic shift. This index, index$_l$, is equal to $f^*_l$, and hence it may be reported as a column index of the strongest coefficient indicator. No additional reporting of $W_f$ may be necessary if the components are configured to be consecutive.

A UE can apply a cyclic shift −index$_l=-f^*_l$ to the columns of the $W_2$, including the bitmap of reported nonzero coefficients and the matrices of amplitudes and phases of these nonzero coefficients, such that the strongest coefficient is moved to the first column. $W_2$, is a $K_1 \times M_v$ matrix of complex coefficients for each layer where only nonzero combination coefficients are reported. The components of $W_f$, if reported, are reported with reference to the component of lowest index, instead of the component of the strongest coefficient, such that the $M_v-1$ reported components are always guaranteed to be within the measurement window of size N configured by the gNB. In practice, the UE can apply a cyclic shift to the components of $W_f$ equal to the index of the first component, $-n_{3,l}^{(0)}$, instead of $$-n_{3,l}^{(f_l^*)}$$

as would be the case in Rel-16. The gNB, in reconstructing the PMI, may apply an opposite cyclic shift, index$_l$, to the columns of the reconstructed $W_2$ such that they correspond one-to-one to the components of $W_f$ in ascending order of index: the first column of $W_2$, after the shift index$_l$, corresponds to component of index 0, the second column of $W_f$ to the component of lowest index amongst the $M_v-1$ reported component (i.e., to the first reported component), etc., until the last column of $W_f$ corresponding to the last of the $M_v-1$ reported components. Equivalently, the gNB may obtain the components of $W_f$ for layer 1 after applying the cyclic shift: $(n_{3,l}^{(f)}-n_{3,l}^{(index_l)})$ mod $N_3$. In this case, the gNB would apply the reconstructed $W_2$ without cyclic shifts.

The following describes further possible detail to modifying the indices $i_{1,5}$ and $i_{1,6,l}$ introduced in 3GPP Rel-16.

In the first example the $M_v$ vectors of $W_f$, for layer $l=1, \ldots, v$, can be identified by $M_{initial,l}^R$, and $n_{3,l}$ $$M_{initial,l}^R \in \{-N+1, -N+2, \ldots, 0\} \tag{2}$$

$$n_{3,l} = [n_{3,l}^{(0)}, \ldots, n_{3,l}^{(M_v-1)}] \tag{3}$$

where $M_{initial,l}^R$ is indicated by means of an index $i_{1,5,l}$ with value set $$i_{1,5,l} \in \{0,1, \ldots, N-1\} \tag{4}$$

and $n_{3,l}$ is indicated by a combinatorial index $i_{1,6,l}$ with value set $$i_{1,6,l} \in \left\{0, 1, \ldots, \binom{N-1}{M_v-1} - 1\right\}.  \quad (5)$$

This is illustrated in FIG. 7. The mapping of $M_{initial,l}^R$ to $i_{1,5,l}$ and the mapping of the nonzero indices of $n_{3,l}^{(f)}$ in the reporting window for layer l to $i_{1,6,l}$ can reuse the description in Section 5.2.2.2.5 of TS 38.214 Re-16 with the following modifications: $M_{initial}$ is replaced by $M_{initial,l}^R$ of (2) and $2M_v$ is replaced by N. More precisely: $M_{initial,l}^R$ is indicated by $i_{1,5,l}$, which is reported and given by $$i_{1,5,l} = \begin{cases} M_{initial,l}^R & M_{initial,l}^R \geq 0 \\ M_{initial,l}^R + N & M_{initial,l}^R < 0 \end{cases} \quad (6)$$

Only the nonzero indices $n_{3,l}^{(f)} \in \text{IntS}$, where $\text{IntS} = \{(M_{initial,l}^R + i) \bmod N_3, i=0, 1, \ldots, N-1\}$, are reported, where the indices $f=1, \ldots, M_v-1$ are assigned such that $n_{3,l}^{(f)}$ increases as f increases. Let $$n_l^{(f)} = \begin{cases} n_{3,l}^{(f)} & n_{3,l}^{(f)} \leq M_{initial,l}^R + N - 1 \\ n_{3,l}^{(f)} - (N_3 - N) & n_{3,l}^{(f)} > M_{initial,l}^R + N - 1 \end{cases}, \quad (7)$$

then $i_{1,6,l} = \Sigma_{f=1}^{M_v-1} C(N-1-n_l^{(f)}, M_v-f)$, where $C(x,y)$ is given in Table 5.2.2.2.5-4 of 3GPP TS 38.214 Rel-16.

To operate according to FIG. 7, the UE can be configured to apply a cyclic shift of $$-n_{3,l}^{(f_l^*)}$$

to the components of $W_f$, modulo $N_3$:

$$n_{3,l}^{(f)} = \left(n_{3,l}^{(f)} - n_{3,l}^{(f_l^*)}\right)$$

mod $N_3$. The UE can apply a cyclic shift of $-f^*_l$ to the columns of $W_2$, modulo $M_v$: $f=(f-f^*_l) \bmod M_v$. The UE can report $n_{3,l}^{(f)}$ for $f=1, \ldots, M_v-1$, after the shift using $$\left\lceil \log_2 \binom{N-1}{M_v-1} \right\rceil \text{ bits.}$$

The UE can also report $M_{initial,l}^R \in \{0, 1, \ldots, N-1\}$, for layer l using $\lceil \log_2 N \rceil$ bits. The UE reports the position of the strongest coefficient of layer l by means of $i^*_l$ with $i^*_l \in \{0, 1, \ldots, K_1-1\}$ using $\lceil \log_2 K_1 \rceil$ bits. In the second example the $M_v$ vectors of $W_f$ for layer $l=1, \ldots, v$, are identified $n_{3,l}$ of (3), indicated by a combinatorial index $i_{1,6,l}$ with value set $$i_{1,6,l} \in \left\{0, 1, \ldots, \binom{2(N-1)}{M_v-1} - 1\right\} \quad (8)$$

The mapping of the nonzero indices of $n_{3,l}^{(f)}$ in the reporting window for layer l to $i_{1,6,l}$ can reuse the description in Sec. 5.2.2.2.5 of 3GPP TS 38.214 Rel-16 with the following modifications: $M_{initial}$ is replaced by $M_{initial}^R = -N+1$ for all layers and $2M_v$ is replaced by $2N-1$. More precisely:

Only the nonzero indices $n_{3,l}^{(f)} \in \text{IntS}$, where $\text{IntS} = \{(-N+1+i) \bmod N_3, i=0, 1, \ldots, N-1\}$, are reported, where the indices $f=1, \ldots, M_v-1$ are assigned such that $n_{3,l}^{(f)}$ increases as f increases. Let $$n_l^{(f)} = \begin{cases} n_{3,l}^{(f)} & n_{3,l}^{(f)} \leq 0 \\ n_{3,l}^{(f)} - (N_3 - 2N + 1) & n_{3,l}^{(f)} > 0 \end{cases}, \quad (9)$$

then $i_{1,6,l} = \Sigma_{f=1}^{M_v-1} C(2N-2-n_l^{(f)}, M_v-f)$, where $C(x,y)$ is given in Table 5.2.2.2.5-4 of 3GPP TS 38.214 Rel-16.

To operate according to FIG. 8, the UE can be configured to apply a cyclic shift of $$-n_{3,l}^{(f_l^*)}$$

to the components of $W_f$, modulo $N_3$:

$$n_{3,l}^{(f)} = \left(n_{3,l}^{(f)} - n_{3,l}^{(f_l^*)}\right)$$

mod $N_3$. The UE can apply a cyclic shift of $-f^*_l$ to the columns of $W_2$, modulo $M_v$: $f=(f-f^*_l) \bmod M_v$. The UE reports $n_{3,l}^{(f)}$ for $f=1, \ldots, M_v-1$, after the shift using $$\left\lceil \log_2 \binom{2N-2}{M_v-1} \right\rceil \text{ bits,}$$

and the UE reports the position of the strongest coefficient of layer l by means of $i^*_l$, with $i^*_l \in \{0, 1, \ldots, K_1-1\}$ using $\lceil \log_2 K_1 \rceil$ bits For a special case of $N=M_v=2$ both examples above require only 1-bit signalling per layer. In particular, for the first example, only $i_{1,5,l} \in \{0,1\}$ is reported and $i_{1,6,l}=0$ and is not reported. On the other hand, for the second example, only $i_{1,6,l}=\{0,1\}$ is reported.

In the case $N=M_v>2$, however, the first example requires fewer bits than the second example. In particular, for the first example, only $i_{1,5,l} \in \{0, 1, \ldots, M_v-1\}$ is reported and $i_{1,6,l}=0$ and is not reported. Hence, $\lceil \log_2 M_v \rceil$ bits are needed per layer. On the other hand, the second example becomes rapidly inefficient as it requires 3 bits for $N=M_v=3$, 5 bits for $N=M_v=4$, etc., whereas the first example requires 2 bits in both these two cases.

Moreover, in case the selected $M_v$ components are configured by the gNB to be consecutive within a measurement window of size $N>M_v$, the first example can still be used by specifying the same signalling as for the case $N=M_v$, i.e., by reporting only $i_{1,5,l} \in \{0, 1, \ldots, M_v-1\}$. Such a configuration will have a positive effect on UL overhead reduction since no additional information on $W_f$ needs to be fed back by the UE other than this layer-specific index. This configuration refers to the $M_v$ components of $W_f$ being configured to be consecutive within the window of size N.

FIGS. 9, 10 and 11 relate to an aspect where no change as such is applied to the size and position of a reporting window in relation to the measurement window configuration. Instead, the reported strongest component can be indicated such that it can be in a different position from the first column.

In the flowchart of FIG. 9 a device receives at 300 configuration information for configuring a measurement window of a compression matrix of the port selection codebook, the configuration information defining the size of the measurement window. The device then selects at 302 the number of coefficient components of the measurement window based on the configuration information. When reporting, the device indicates at 304 row and column index of the position of the strongest coefficient components in a matrix of nonzero combination coefficients for each layer and applies a cyclic shift to the columns of the matrix of nonzero combination coefficients for each layer such that the strongest coefficient is shifted to the first column.

The flowchart of FIG. 10 relates to operation at a network device receiving the report. The device sends at 400 configuration information for configuring a measurement window of a compression matrix of a port selection codebook, the configuration information defining the number of components of the measurement window. CSI report including PMI is then received at 402. In the report a row and column index is indicated for the position of the strongest coefficient in a matrix of nonzero combination coefficients for each layer and a cyclic shift is applied to the columns of the matrix of nonzero combination coefficients for each layer such that the first column is shifted to the indicated column index.

The UE may report $W_f$ with respect to the first component rather than the component of the strongest coefficient. A layer-specific $M_{initial}$ is not necessary because there is no out-of-window components. The UE can still apply the shift $-f^*_l$ relative to the strongest coefficient to $W_2$ and then report the value of this shift as a part of the strongest coefficient indicator. $W_f$ is not aligned with $W_2$ but because gNB knows $f^*_l$, it can correct the shift on $W_f$ (See FIGS. 12-14) or undo the shift on $W_2$ (See FIGS. 15-17). Either way, the gNB can align $W_f$ and $W_2$ because of the additional reporting of the column index of the strongest coefficient. The layer specific $W_f$ can be reported for each layer, and can comprise $M_v-1$ components (component 0 is always there and does not need reporting).

The UE can be configured to apply a cyclic shift of $-n_{3,l}^{(0)}$ to the components of $W_f$ (no modulo $N_3$ is needed): $n_{3,l}^{(f)}=(n_{3,l}^{(f)}-n_{3,l}^{(0)})$. The UE can apply a cyclic shift of $-f^*_l$ to the columns of $W_2$, modulo $M_v$: $f=(f-f^*_l)$mod $M_v$ before reporting. The UE reports $n_{3,l}^{(f)}$ for $f=1, \ldots, M_v-1$, after the shift using $$\left\lceil \log_2 \binom{N-1}{M_v-1} \right\rceil \text{ bits.}$$

The UE reports the position of the strongest coefficient of layer l by means of $[i^*_l, f^*_l]$, with $i^*_l \in \{0, 1, \ldots, K_1-1\}$ and $f^*_l \in \{0, 1, \ldots, M_v-1\}$ using $\lceil \log_2(K_1 M_v) \rceil$ bits (or $\lceil \log_2 K_1 \rceil + \lceil \log_2 M_v \rceil$ bits).

FIGS. 12 to 17 show index mappings for N values 2, 3 and 4. Alignment of the indices of W2 and Wf can be done by shifting to indices of W2 (examples in FIG. 15-17) or shifting to indices of Wf (examples in FIG. 12-14). The flow chart in FIG. 10 relates to the gNB shift on $W_2$.

As observed earlier, in both of the above examples $N=M_v=2$ can also be described in simpler terms by reporting an index$_l \in \{0, 1, \ldots, M_v-1\}$ for each layer $l=1, \ldots, v$, corresponding to the component of the strongest coefficient. Another possible description is by using tables to map the index value (either $i_{1,5,l}$ or $i_{1,6,l}$) to the FD component index $n_{3,l}^{(1)}$, as shown in FIG. 15 showing mapping of the index reporting $W_f$ to the component index $n_{3,l}^{(1)}$ for $N=M_v=2$. It can be noted that $n_{3,l}^{(0)}=0$ by construction denotes component 0. Hence, the table shows the value of component 1, $n_{3,l}^{(1)}$, obtained at the gNB by taking the nonzero value after applying the cyclic shift: $(n_{3,l}^{(f)}-n_{3,l}^{(index_l)})$mod $N_3=(f-index_l)$ mod $N_3$, for $n_{3,l}^{(f)}$, $f \in \{0,1\}$. In other words, the first row of the table corresponds to layer 2 (B) of FIG. 7, whilst the second row corresponds to layer 1 (A) of FIG. 7. $N_3$ denotes the number of PMI sub-bands and equals 13 in FIG. 7.

FIG. 16 shows an example of mapping of the index reporting $W_f$ to the component index $[n_{3,l}^{(1)}, n_{3,l}^{(2)}]$ for $N=M_v=3$. FIG. 17 shows an example of mapping of the index reporting $W_f$ to the component index $[n_{3,l}^{(1)}, n_{3,l}^{(2)}, n_{3,l}^{(3)}]$ for $N=M_v=4$. For $N=M_v=3$ and $N=M_v=4$, FIG. 16 and FIG. 17, respectively, show the values of the $M_v$ components obtained at the gNB after the shift: $(f-index_l)$ mod $N_3$, for $f \in \{0, 1, \ldots M_v\}$ and reordering in increasing order.

A communication device, for example a user equipment, can comprise means for reporting a PMI in a CSI report configured with port selection codebook in which the $M_v$ DFT-based vectors of $W_f$ are restricted in a configured measurement window of size N and the strongest coefficient in each layer is expected to be located in the first column of the bitmap of the reported nonzero coefficients of $W_2$. A network device, for example an gNB, can comprise means for reconstructing the precoders from the PMI. One or more indices of the PMI ca be associated to a reporting window for $W_f$, which can be different from the configured measurement window. The reporting window may also be common for all layers. The $M_v$ components may be configured to be consecutive and the index associated to the reporting window correspond to the component of the strongest coefficient inside the configured measurement window. A cyclic shift of −index can be applied by the UE to the columns of the $W_2$, before reporting, including the bitmap of reported nonzero coefficients and the matrices of amplitudes and phases of these nonzero coefficients, such that the strongest coefficient is moved to the first column. In this case the $M_v-1$ nonzero components may not be reported.

Figure 18:
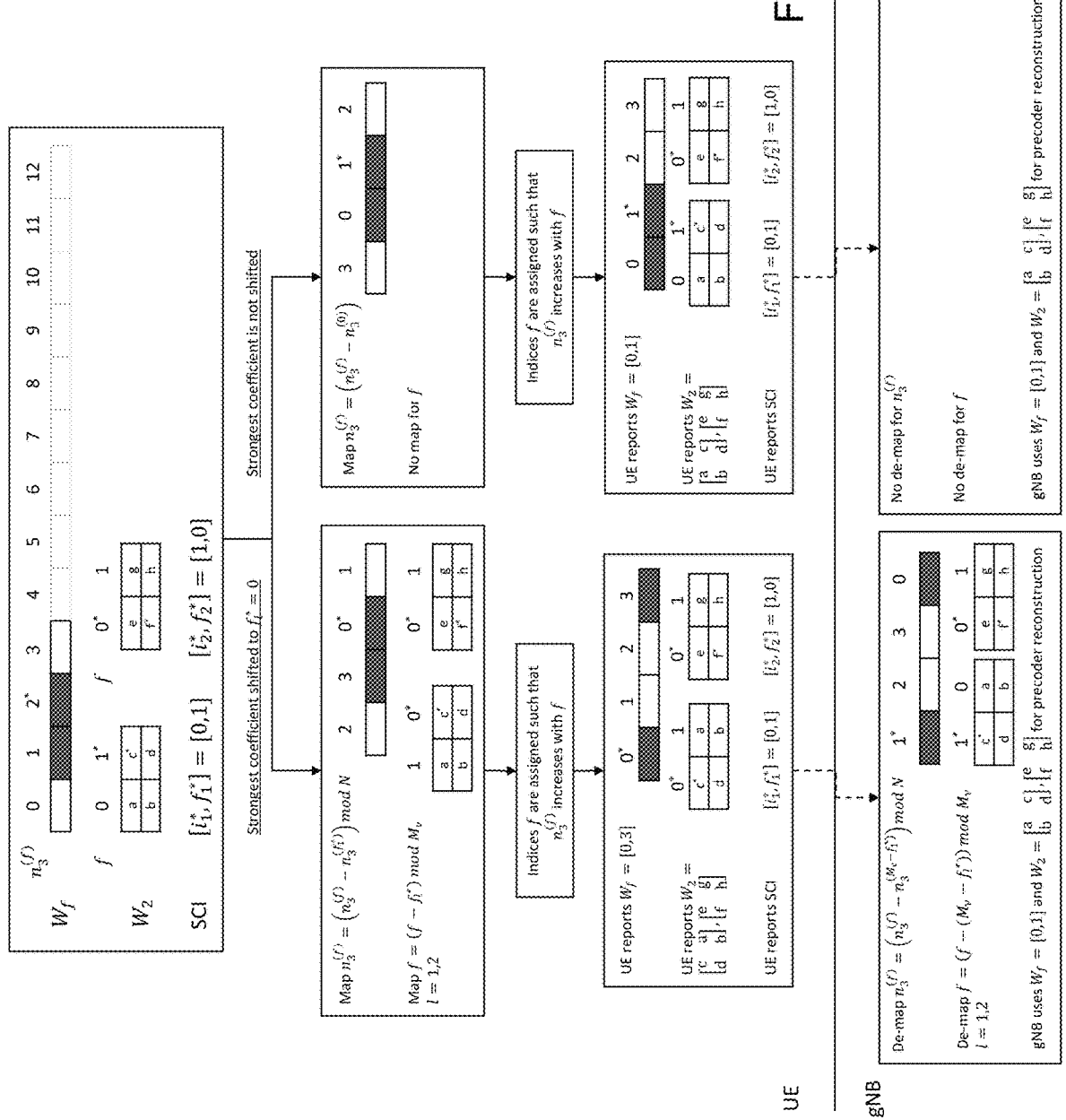
FIG. 18 shows another solution for solving the out of window problem according to an embodiment.
Figure 19:
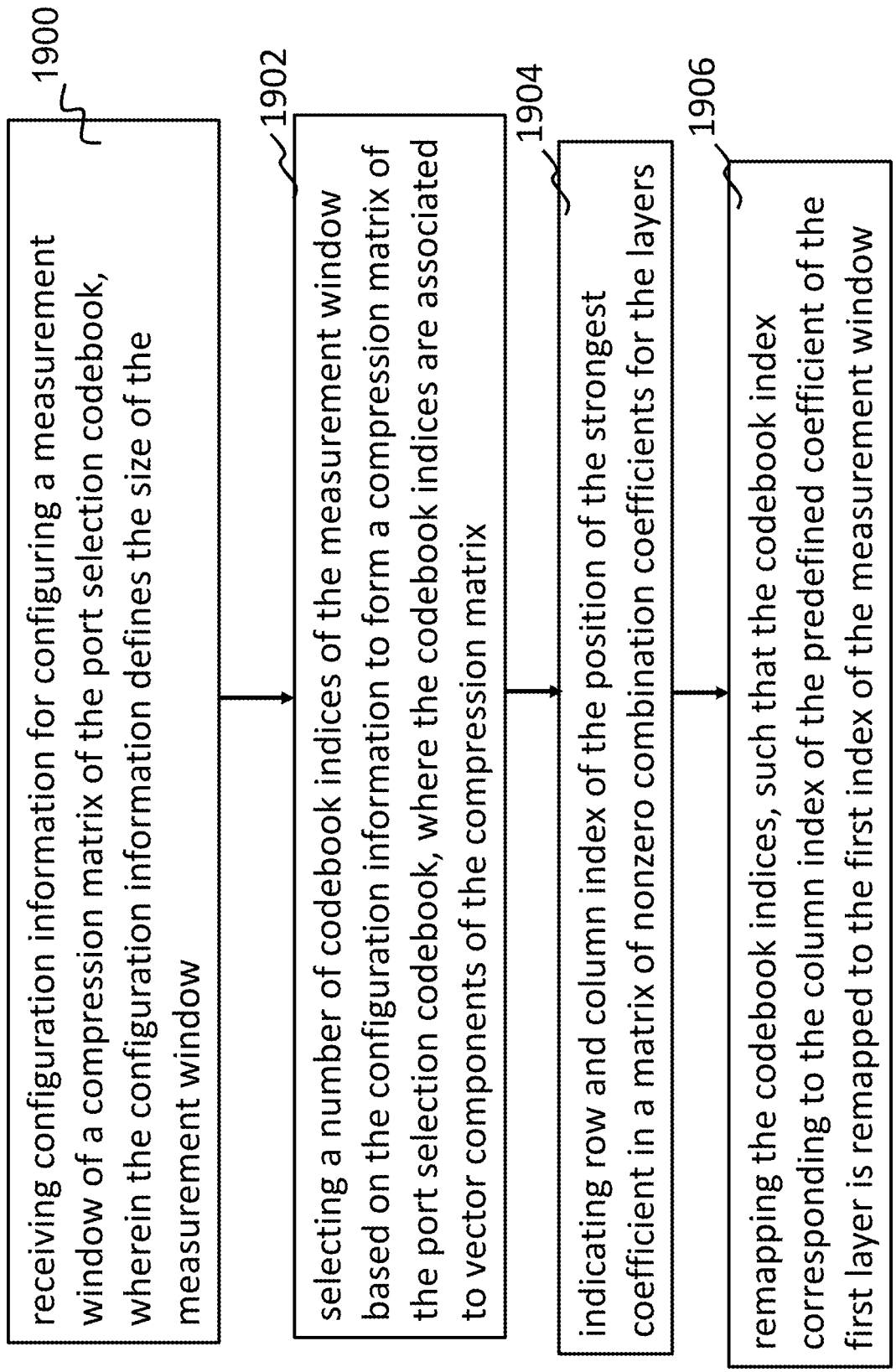
FIGS. 19-20 show methods, according to some embodiments.
Figure 20:
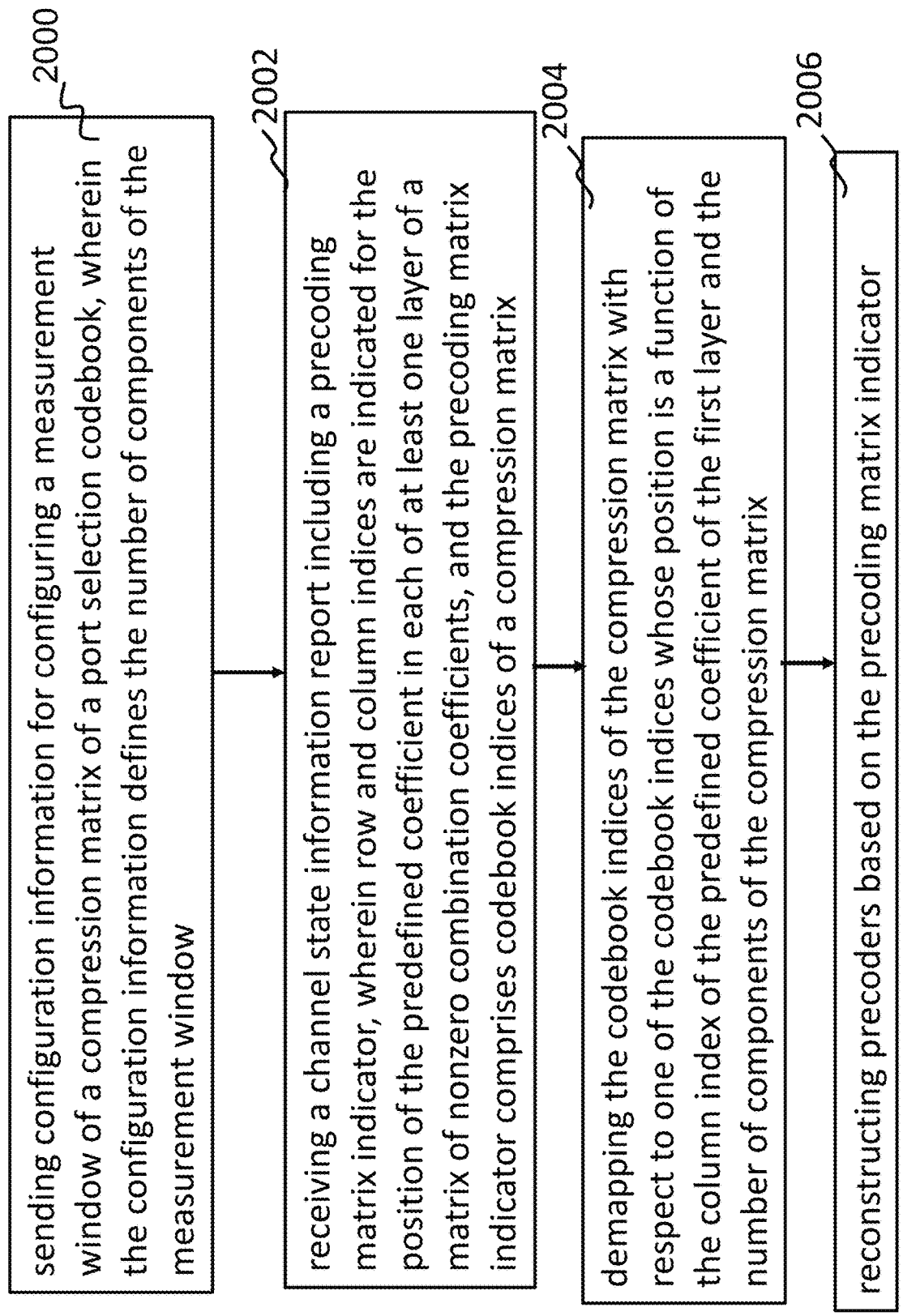

Let us take a look at another possible solution for the out-of-window problem with respect to FIGS. 18-20. In practice, in Rel-16 the components of $W_f$, which is layer-specific, are shifted accordingly with a modulo-$N_3$ operation. In Rel-17 ongoing work to specify FeType II PS codebook, it was agreed that the $M_v$ components (a.k.a., frequency domain or FD bases) are limited within a single window of size N and initial point $M_{init}=0$.

In Rel-17, however, because of the window/set restriction of size N configured by the gNB, the SCI needs to be modified by adding information related to the FD component of the strongest coefficient, i.e., either $$n_{3,l}^{(f^*_l)}$$

or $f^*_l$. The need for this modification can be illustrated, for example, in the case $N=M_v=2$, for which $W_f=[n_3^{(0)}, n_3^{(1)}]=[0, 1]$ is layer-common and not reported. The measurement window for $W_f$ restricts the maximum separation between the selected components.

Note that the $M_v$ codebook indices associated to the vector components of the compression matrix $W_f$ are given by $n_3^{(f)} \in \{0, 1, \ldots, N-1\}$, with $f=0, 1, \ldots, M_v-1$, and they are indexed by f, which indicates the corresponding column of the matrix of nonzero combination coefficients, $W_2$. In this description, we also refer to $n_3^{(f)}$ as FD (frequency domain) component indices and to f as column index of the matrix of nonzero combination coefficients.

FIG. 3 illustrates an example for this window configuration, in which the strongest coefficient of layers 1 and 2 are in two different components. Because $W_f$ is layer common and not reported, the first component, $n_3^{(0)}=0$, may not correspond to the component of the strongest coefficient for some layer. Therefore, both coordinates $[i^*_l, f^*_l]$ of the strongest coefficient need to be reported for each layer 1 to be able to locate the strongest coefficient, where $i^*_l \in \{0, 1, \ldots, K_1-1\}$ indicates the row of the matrix of nonzero combination coefficient (which corresponds to one of the $K_1$ selected CSI-RS ports) and $f^*_l \in \{0, 1, \ldots, M_v-1\}$ indicates the column of the matrix of nonzero combination coefficients. Note that in this case, when $N=M_v$, the FD component index of the strongest coefficient, $$n_3^{(f_1^*)},$$

and the column index of the strongest coefficient in $W_2$, $f^*_l$, take the same values, i.e., $$n_3^{(f_1^*)} = f_l^*,$$

hence $f^*_l$ can be reported separately with $\lceil \log_2 N \rceil = \lceil \log_2 M_v \rceil$ bits, or jointly with $i^*_l$, by using $\lceil \log_2(K_1 M_v) \rceil$ bits.

In the current agreement regarding the relationship between N and $M_v$, there is also the possibility that $N > M_v$, in which case $W_f$ needs reporting and it can be layer-common or layer-specific. To minimise overhead and following Rel-16 design, we assume that in this case $W_f$ is reported by a combinatorial coefficient using $$\left\lceil \log_2 \binom{N-1}{M_v-1} \right\rceil \text{ bits,}$$

such that component 0 is always included in $W_f$ and not reported. Because only $M_v-1$ FD components are reported, a reference component needs to be specified, which determines the modulo-N shift operation applied to the components of $W_f$ before reporting.

For Rel-17 port selection codebook, to report the $M_v$ components of $W_f$ using $$\left\lceil \log_2 \binom{N-1}{M_v-1} \right\rceil \text{ bits,}$$

it is proposed to remap the components with respect to the component of the strongest coefficient using a modulo-N operation and reporting only the $M_v-1$ nonzero components after remapping. If no remapping is applied, $$\left\lceil \log_2 \binom{N}{M_v} \right\rceil \text{ bits}$$

would be needed to report all $M_v$ components resulting in higher feedback overhead.

In an embodiment, the FD bases are shifted with respect to the basis of the strongest coefficient, $$n_3^{(f_1^*)},$$

such that $$\tilde{n}_3^{(f)} = \left(n_3^{(f)} - n_3^{(f_1^*)}\right)$$

mod N, after shifting. This operation is similar to what is done in Rel-16, except for the modulo-N operation, which in Rel-16 is modulo-$N_3$, because there is no gNB-defined measurement window for $W_f$ in Rel-16. The formula also assumes that the FD bases $n_3^{(f)}$ (i.e. the codebook indices of the vector components of the compression matrix $W_f$) are layer-common, i.e., a single set is reported for all layers. However, the operation is also applicable in case of layer-specific $W_f$.

At the gNB, using the reported FD bases in the precoder reconstruction would not be correct, if $f^*_1 > 0$, because of the modulo-N operation which remaps the FD bases to the left of $$n_3^{(f_1^*)},$$

i.e., $n_3^{(0)}, \ldots,$ $$n_3^{(f_1^*-1)},$$

inside the window, as $$n_3^{(M_v-f_1^*)},$$

$n_3^{(M_v-1)}$. This modulo-N operation can be undone at the gNB by remapping with respect to $$n_3^{(f_1^*)},$$

such that $$n_3^{(f)} = \left(\tilde{n}_3^{(f)} + n_3^{(f_1^*)}\right) \bmod N,$$

after remapping. However, this would require reporting $$n_{3,l}^{(f_l^*)}$$

$\in \{0, 1, \ldots, N-1\}$ using $\lceil \log_2 N \rceil$ bits. Instead, the proposal allows correct demapping by reporting $f^*_l \in \{0, 1, \ldots, M_v-1\}$, which is one of the two SCI indices, $[i^*_l, f^*_l]$. In the proposal, the gNB remaps/demaps the reported FD bases with respect to $$n_3^{(M_v-f_1^*)}$$

as $$n_3^{(f)} = \left(n_3^{(f)} - n_3^{(M_v-f_1^*)}\right) \bmod N,$$

such that $$n_3^{(M_v-f_1^*)} = 0$$

after demapping.

The proposed solution is an alternative to remapping the $M_v$ components with respect to the first basis, $n_3^{(0)}$, such that $n_3^{(f)}=(n_3^{(f)}-n_3^{(0)})$, after shifting. This alternative does not require a modulo-N operation. For the proposed solution, the result of the demapping at the gNB is the same as if the remapping at the UE was done with respect to first basis, $n_3^{(0)}$.

In Rel-16, where $W_f$ is layer-specific, the reference component is that of the strongest coefficient for a layer l, such that the component indices of $W_f$ are remapped with respect to $$n_{3,l}^{(f_l^*)}$$

as $$n_{3,l}^{(f)} = \left(n_{3,l}^{(f)} - n_{3,l}^{(f_l^*)}\right) \bmod N_3.$$

This choice of shift for $W_f$ in Rel-16 allows to reduce overhead in the reporting of $W_f$ as well as in the reporting of the SCI because only the first coordinate of the pair $[i^*_l, f^*_l]$ identifying the position of the strongest coefficient for layer l needs reporting. For this latter overhead saving to be possible in Rel-16 a second shift needs to be applied to the column indices of $W_2$, which are remapped with respect to $f^*_l$ as $f=(f-f^*_l) \bmod M_v$, such that the columns of $W_2$ correspond to those of $W_f$ after the shift.

In Rel-17, however, both coordinates of the SCI need reporting even in the case $W_f$ is reported (for $N>M_v$) and the strongest coefficient is shifted to $f^*_l=0$. Hence, in case of reporting of $W_f$, a different shift from Rel-16 may be specified for the components of $W_f$, and the shift to the columns of $W_2$ may not be applied.

There are two possible components that can be taken as reference for $W_f$: the component of the strongest coefficient as in Rel-16, or the 'first' selected component, i.e., the component with the lowest index value in the window: {0, 1 ..., N–1}. Depending on the choice of layer-common or -specific $W_f$, the following mapping choices are available for $W_f$.

1. Layer-common $W_f=[n_3^{(0)}, \ldots, n_3^{(M_v-1)}]$
   a. The reference is the component of the strongest coefficient for layer l, $$n_3^{(f_1^*)}.$$

The FD components are remapped with respect to $$n_3^{(f_1^*)}$$

as $$n_3^{(f)} = \left(n_3^{(f)} - n_3^{(f_1^*)}\right) \bmod N_3,$$

such that $$n_3^{(f_1^*)} = 0$$

after remapping.
   b. The reference is the 'first' component, $n_3^{(0)}$. The FD components are remapped with respect to $n_3^{(0)}$ as $n_3^{(f)}=(n_3^{(f)}-n_3^{(0)})$, such that $n_3^{(0)}=0$ after remapping.
2. Layer-specific $W_f=[n_{3,l}^{(0)}, \ldots, n_{3,l}^{(M_v-1)}]$, for $l=1, \ldots, v$
   a. The reference is the component of the strongest coefficient for layer l, $$n_{3,l}^{(f_l^*)}.$$

The FD components are remapped with respect to $$n_{3,l}^{(f_l^*)} \text{ as } n_{3,l}^{(f)} = \left(n_{3,l}^{(f)} - n_{3,l}^{(f_l^*)}\right) \bmod N,$$

such that $$n_{3,l}^{(f_l^*)} = 0$$

after remapping.
   b. The reference is the 'first' component, $n_{3,l}^{(0)}$. The FD components are remapped with respect to $n_{3,l}^{(0)}$ as $n_3^{(f)}=(n_{3,l}^{(f)}-n_{3,l}^{(0)})$, such that $n_3^{(0)}=0$ after remapping.

If no shift is specified for $W_f$, a UE may understand that $W_f=[0, n_3^{(1)}, \ldots, n_3^{(M_v-1)}]$, in the layer-common case, for example, i.e., it may assume that the first component, $n_3^{(0)}=0$ is fixed and only select and report $M_v -1$ nonzero components in the window of size N.

Regarding the shift applied to the columns of $W_2$, there are in practice two possible options: no shift or shifting the index f with respect to $f^*_l$ as $f=(f-f^*_l) \bmod M_v$, such that the index of the strongest coefficient is $f^*_l=0$ after remapping.

For all the above alternatives of index mapping of $W_f$ and $W_2$, reporting of the pair $[i^*_l, f^*_l]$ as SCI for layer l is enough to locate the strongest coefficient of $W_2$ and to ensure correct reconstruction of $W_f$. Reporting the values $$\left[i^*_l, n_3^{(f_l^*)}\right],$$

as an alternative, also works but requires more feedback bits if $N>M_v$ because $$n_3^{(f_l^*)}$$

$\in \{0, 1, \ldots, N-1\}$, whereas $f^*_l \in \{0, 1, \ldots, M_v-1\}$.

Let us consider an example for the cases 1.a and 1.b above, with $N=4>M_v=2$ and with layer-common $$W_f = [n_3^{(0)}, n_3^{(1)}] = [1, 2].$$

Let us assume that, for layer 1, $$W_2 = \begin{bmatrix} a & c \\ b & d \end{bmatrix}$$

and the strongest coefficient is c in position $[i^*_1, f^*_1]=[0,1]$; for layer 2, $$W_2 = \begin{bmatrix} e & g \\ f & h \end{bmatrix}$$

and the strongest coefficient is f in position $[i^*_2, f^*_2]=[1,0]$. This example is illustrated in FIG. 18. A star-subscript denotes the strongest component. On the left-hand side the UE and gNB operations are shown in the case 1.a, wherein the strongest coefficient for each layer is shifted to FD component 0 and the shift applied to $W_f$ follows that of layer 1. Case 1.b is shown on the right-hand side, wherein the strongest coefficient is not shifted and the shift applied to $W_f$ is with respect to the selected component of lowest index.

In case 1.a, the components of $W_f$ are remapped with respect to $$n_3^{(f_l^*)} = 2$$

as $n_3^{(f)}=(n_3^{(f)}-2) \bmod 4$, $f=0,1$, such that $W_f=[0,3]$ is the reported FD basis set. The index f is remapped with respect to $f^*_1=1$ as $f=(f-1) \bmod 2$, for layer 1, and with respect to $f^*_2=0$, i.e., no shift is applied, for layer 2. The reported combination coefficient matrices are $$W_2 = \begin{bmatrix} c & a \\ d & b \end{bmatrix}, \begin{bmatrix} e & g \\ f & h \end{bmatrix}.$$

At the gNB, using $W_f=[0,3]$ in the precoder reconstruction would not be correct because the selected components to the left of $$n_3^{(f_1^*)},$$

i.e., $n_3^{(0)}, \ldots,$ $$n_3^{(f_1^*-1)}$$

have been remapped inside the window by the modulo N, as $$n_3^{(M_v-f_1^*)},$$

$n_3^{(M_v-1)}$. Hence, the gNB needs to remap the $M_v$ components of $W_f$ with respect to $$n_3^{(M_v-f_1^*)},$$

if $f^*_1>0$, as $$n_3^{(f)} = \left(n_3^{(f)} - n_3^{(M_v-f_1^*)}\right) \bmod N,$$

such that $$n_3^{(M_v-f_1^*)} = 0$$

after demapping. If $f^*_1=0$, no remapping is needed because no component of $W_f$ was remapped by the modulo operation. An equivalent way to describe the demapping at the gNB is by remapping the components of $W_f$ with respect to $$n_3^{((M_v-f_1^*) \bmod M_v)},$$

as $$n_3^{(f)} = \left(n_3^{(f)} - n_3^{((M_v-f_1^*) \bmod M_v)}\right)$$

mod N, such that $$n_3^{(M_v-f_1^*) \bmod M_v} = 0,$$

after demapping. In our example, $W_f$ is remapped with respect to n $$n_3^{(M_v-f_1^*)} = n_3^{(1)} = 3$$

as $n_3^{(f)}=(n_3^{(f)}-3) \bmod 4$, $f=0,1$. The gNB also de-maps f as $f=(f-(M_v-f^*_l)) \bmod M_v = (f+f^*_l) \bmod M_v$, for $l=1,2$ such that $W_f=[0,1]$ and $$W_2 = \begin{bmatrix} a & c \\ b & d \end{bmatrix}, \begin{bmatrix} e & g \\ f & h \end{bmatrix}$$

are used in the precoder reconstruction. It is noted that the UE remaps $[n_3^{(0)}, n_3^{(1)}]=[1,2]$ to $[n_3^{(0)}, n_3^{(1)}]=[3,0]$, but when reporting these components the indices f are assigned such that $n_3^{(f)}$ increases with f, so the gNB receives $[n_3^{(0)}, n_3^{(1)}]=[0,3]$. This is shown in FIG. 18.

In case 1.b, the components of $W_f$ are remapped with respect to $n_3^{(0)}=1$ as $n_3^{(f)}=(n_3^{(f)}-1)$, $f=0,1$, such that $W_f=[0,$ 1] is the reported FD basis set. No mapping is applied to the index f, hence the combination coefficient matrices $W_2$ are reported without shifting the strongest coefficient to FD component 0, as $$W_2 = \begin{bmatrix} a & c \\ b & d \end{bmatrix}, \begin{bmatrix} e & g \\ f & h \end{bmatrix}.$$

At the gNB, no de-mapping is required and the reported quantities for $W_f$ and $W_2$ are used in the precoder reconstruction.

This example illustrates that, no matter what solution is adopted for the representation of $W_f$ and $W_2$, the SCI can be reported as the index pair $[i^*_l, f^*_l]$ for l=1, . . . , v.

Table 1 and Table 2 summarise the mapping options discussed above for the components of $W_f$ and the column index of $W_2$ in case of layer-common and layer-specific $W_f$.

Note that the mapping and de-mapping of $W_f$ is only applicable for $N>M_v$, whereas for $N=M_v$, $W_f$ is layer-common and fixed by configuration.

TABLE 1

Summary of UE's mapping options for the components of $W_f$ and column index of $W_2$. In all cases the SCI can be reported as $[i^*_l, f^*_l]$ for layer l.

| | | UE | | | |
|---|---|---|---|---|---|
| | | $N > M_v$ ($W_f$ reported) | | $N \geq M_v$ | |
| | choice of shift for $W_f$ and $W_2$ | map of $n_{3,l}^{(f)}/n_{3,l}^{(f)}$ ($W_f$) | map of f ($W_2$) | map of f ($W_2$) | SCI layer l |
| layer-common $W_f$ | Strongest coefficient is shifted to $f^*_l = 0$ | $n_{3}^{(f)} = \left(n_{3}^{(f)} - n_{3}^{(f^*_1)}\right)$ mod N | $f = (f - f^*_l)$ mod $M_v$ | | $[i^*_l, f^*_l]$ |
| | Strongest coefficient is not shifted | $n_{3,l}^{(f)} = (n_{3,l}^{(f)} - n_{3,l}^{(0)})$ | — | | $[i^*_l, f^*_l]$ |

TABLE 1-continued

Summary of UE's mapping options for the components of $W_f$ and column index of $W_2$. In all cases the SCI can be reported as $[i^*_l, f^*_l]$ for layer l.

| | | UE | | | |
|---|---|---|---|---|---|
| | | $N > M_v$ ($W_f$ reported) | | $N \geq M_v$ | |
| | choice of shift for $W_f$ and $W_2$ | map of $n_{3,l}^{(f)}/n_{3,l}^{(f)}$ ($W_f$) | map of f ($W_2$) | map of f ($W_2$) | SCI layer l |
| layer-common $W_f$ | Strongest coefficient is shifted to $f^*_l = 0$ | $n_{3,l}^{(f)} = \left(n_{3,l}^{(f)} - n_{3,l}^{(f^*_1)}\right)$ mod N | $f = (f - f^*_l)$ mod $M_v$ | | $[i^*_l, f^*_l]$ |
| | Strongest coefficient is not shifted | $n_{3,l}^{(f)} = (n_{3,l}^{(f)} - n_{3,l}^{(0)})$ | — | | $[i^*_l, f^*_l]$ |

TABLE 2

Summary of gNB's de-mapping options for the components of $W_f$ and column index of $W_2$. In all cases the SCI can be reported as $[i^*_l, f^*_l]$ for layer l.

| | | gNB | | |
|---|---|---|---|---|
| | | $N > M_v$ ($W_f$ reported) | | |
| | choice of shift for $W_f$ and $W_2$ | De-map of $n_{3,l}^{(f)}/n_{3,l}^{(f)}$ ($W_f$) | De-map of f ($W_2$) | $N \geq M_v$ De-map of f ($W_2$) |
| layer-common $W_f$ | Strongest coefficient is shifted to $f^*_l = 0$ | $n_3^{(f)} = \begin{cases} \left(n_3^{(f)} - n_3^{(M_v - f^*_1)}\right) \text{ mod } N, & f^*_1 > 0 \\ n_3^{(f)} & f^*_1 = 0 \end{cases}$ | $f = (f + f^*_l)$ mod $M_v$ | |
| | Strongest coefficient is not shifted | — | — | |
| layer-specific $W_f$ | Strongest coefficient is shifted to $f^*_l = 0$ | $n_{3,l}^{(f)} = \begin{cases} \left(n_{3,l}^{(f)} - n_{3,l}^{(M_v - f^*_l)}\right) \text{ mod } N, & f^*_l > 0 \\ n_{3,l}^{(f)} & f^*_l = 0 \end{cases}$ | $f = (f + f^*_l)$ mod $M_v$ | |
| | Strongest coefficient is not shifted | — | — | |

FIG. 19 shows a method for the reporting device, such as for a user equipment, following the principles described above, e.g. in FIG. 18. The method may be for providing a channel state information report configured with a port selection codebook. The method may comprise, in step 1900, receiving configuration information for configuring a measurement window of a compression matrix of the port selection codebook, wherein the configuration information defines the size of the measurement window. In an embodiment, the size of the measurement window N is larger than number $M_v$ of codebook indexes the device is allowed to select for defining the compression matrix $W_f$.

In step 1902 the UE selects a number of codebook indices of the measurement window based on the configuration information to form the compression matrix $W_f$ of the port selection codebook, where the codebook indices are associated to vector components of the compression matrix.

In step 1904, the UE indicates row and column index of the position of the strongest coefficient in a matrix $W_2$ of nonzero combination coefficients for the layers. This step may comprise remapping the columns of the matrix $W_2$ of nonzero combination coefficients for the layers such that the strongest coefficient is remapped to the first column.

In step 1906, the UE remaps the codebook indices, such that the codebook index corresponding to the column index of the predefined coefficient of the first layer is remapped to the first index of the measurement window. Remapping may be also called cyclic shifting. In an embodiment the predefined coefficient is the strongest coefficient. In an embodiment, the predefined coefficient is the first coefficient. In an embodiment, this step may comprise reporting all the codebook indices of the compression matrix of the port selection codebook, except the first, after subtracting the codebook index corresponding to the column index of the strongest coefficient of the first layer from all the codebook indices of the compression matrix and applying a modulo operation of the size of the measurement window N. In an embodiment the codebook indices of the measurement window and the compression matrix are DFT vectors.

FIG. 20 shows a method for the device receiving the report, such as for a gNB, following the principles described above, e.g. in FIG. 18. In step 2000 the gNB sends configuration information for configuring a measurement window of a compression matrix $W_f$ of a port selection codebook, wherein the configuration information defines the number N of components of the measurement window. In an embodiment, the size of the measurement window N is larger than number $M_v$ of codebook indexes the UE is allowed to select for defining the compression matrix $W_f$.

In step 2002, the gNB receives a channel state information report including a precoding matrix indicator (PM), wherein row and column indices are indicated for the positions of the strongest coefficients in layers of a matrix $W_2$ of nonzero combination coefficients, and the PMI comprises codebook indices of a compression matrix $W_f$. In an embodiment, these indices have been remapped at the transmitter side as described above, e.g. with respect to the strongest coefficient being shifted to the first index.

In step 2004, the gNB demaps the codebook indices of the compression matrix $W_f$ with respect to one of the codebook indices whose position is a function of the column index of the predefined coefficient of the first layer and the number of components of the compression matrix. In an embodiment, the predefined coefficient is the strongest coefficient. This takes place when it is detected that the column index of the strongest coefficient of the first layer is nonzero.

This step 2004 may comprise that the demapping of the codebook indices of the compression matrix comprises subtracting one of the codebook indices from all the codebook indices of the compression matrix $W_f$ and applying a modulo operation of the size N of the measurement window. In an embodiment the function identifying the position of the one codebook index is obtained by subtracting the nonzero column index of the strongest coefficient of the first layer from the number $M_v$ of components of the compression matrix $W_f$.

In an embodiment the matrix $W_2$ of nonzero combination coefficients and compression matrix $W_f$ of the codebook are aligned based on the indicated column indices of the strongest coefficients.

In step 2006, the gNB constructs precoders based on the received channel state information report.

Although in some circumstances of the description it has been assumed that $W_f$ is layer-common, the solutions are applicable to layer specific $W_f$ as well. In an embodiment, the compression matrix $W_f$ of the port selection codebook for each layer is remapped with respect to the codebook index corresponding to the column index of the strongest coefficient of the respective layer.

It is noted that while the above describes example embodiments, there are several variations and modifications which may be made to the disclosed solution without departing from the scope of the present invention. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi core processor architecture, as non-limiting examples.

Alternatively, or additionally, some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause the communications device and/or device and/or server and/or network entity to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

The invention claimed is:

1. An apparatus comprising:
   at least one processor; and
   at least one memory storing instructions thereon that, when executed by the at least one processor, cause the apparatus to perform at least:
      receiving configuration information for configuring a measurement window of a compression matrix of a port selection codebook, wherein the configuration information defines a size of the measurement window;
      selecting a number of codebook indices of the measurement window based on the configuration information for forming the compression matrix, wherein the codebook indices are associated with vector components of the compression matrix;
      mapping the selected codebook indices with respect to a reference vector component having a lowest index of the selected codebook indices in the measurement window, such that a codebook index of the reference vector component is zero after the mapping; and
      reporting channel state information including a precoding matrix indicator to a network, wherein the precoding matrix indicator comprises information associated with the compression matrix after the mapping.

2. The apparatus of claim 1, wherein the configuration defines a size of the compression matrix.

3. The apparatus of claim 2, wherein the number of selected codebook indices is smaller than the size of the measurement window, and wherein the size of the measurement window is smaller than a number of indices in a codebook set of vector components.

4. The apparatus of claim 1, wherein the selecting of the number of codebook indices comprises identifying the number of codebook indices.

5. The apparatus of claim 1, wherein the precoding matrix indicator indicates the selected codebook indices of the compression matrix, except the first codebook index, after the mapping.

6. The apparatus of claim 1, wherein the instructions stored on the at least one memory, when executed by the at least one processor, further cause the apparatus to perform:
   determining a position of a strongest coefficient in a matrix of nonzero combination coefficients for respective layers of at least one layer to be reported; and
   indicating a row and column index of the position of the strongest coefficient in the matrix of nonzero combination coefficients for respective layers of the at least one layer to be reported.

7. The apparatus of claim 1, wherein the mapping comprises subtracting the index of the reference vector component from all the indices of the compression matrix.

8. The apparatus of claim 3, wherein the first index of the measurement window coincides with the first index of the codebook set of vector components.

9. The apparatus of claim 1, wherein the selected codebook indices are common to all of at least one layer to be reported.

10. The apparatus of claim 1, wherein the index of the reference vector component has an offset with respect to the first index of the measurement window.

11. The apparatus of claim 1, wherein the index of the reference vector component has an offset with respect to an index of a strongest coefficient of the measurement window.

12. The apparatus of claim 1, wherein the vector components associated with the codebook indices of the measurement window and of the compression matrix comprise Discrete Fourier Transform vectors.

13. An apparatus comprising:
   at least one processor; and
   at least one memory storing instructions thereon that, when executed by the at least one processor, cause the apparatus to perform at least:
      sending, to a user equipment, configuration information for configuring a measurement window of a compression matrix of a port selection codebook, wherein the configuration information defines a size of the measurement window;
      receiving a channel state information report including a precoding matrix indicator comprising information of the compression matrix after mapping, wherein the mapping of selected codebook indices is performed with respect to a reference vector component having a lowest index of the selected codebook indices in the measurement window such that a codebook index of the reference vector component is zero after the mapping; and
      reconstructing precoders based on the precoding matrix indicator.

14. A method comprising:
   receiving configuration information for configuring a measurement window of a compression matrix of a port selection codebook, wherein the configuration information defines a size of the measurement window;
   selecting a number of codebook indices of the measurement window based on the configuration information for forming the compression matrix, wherein the codebook indices are associated with vector components of the compression matrix;
   mapping the selected codebook indices with respect to a reference vector component having a lowest index of the selected codebook indices in the measurement window, such that a codebook index of the reference vector component is zero after the mapping; and
   reporting channel state information including a precoding matrix indicator to a network.

15. The method of claim 14, wherein the configuration defines a size of the compression matrix.

16. The method of claim 15, wherein the number of codebook indices is smaller than the size of the measurement window, and wherein the size of the measurement window is smaller than a number of indices in a codebook set of vector components.

17. The method of claim 14, wherein the precoding matrix indicator indicates the codebook indices of the compression matrix, except the first codebook index, after the mapping.

18. The method of claim 14, wherein the vector components associated with the codebook indices of the measurement window and of the compression matrix comprise Discrete Fourier Transform vectors.

19. A method comprising:
   sending, to a user equipment, configuration information for configuring a measurement window of a compression matrix of a port selection codebook, wherein the configuration information defines a size of the measurement window;
   receiving a channel state information report including a precoding matrix indicator comprising information about the compression matrix after mapping, wherein the mapping of selected codebook indices is performed with respect to a reference vector component having a lowest index of the selected codebook indices in the measurement window, such that a codebook index of the reference vector component is zero after the mapping; and
   reconstructing precoders based on the precoding matrix indicator.

* * * * *

UNITED STATES PATENT AND TRADEMARK OFFICE
CERTIFICATE OF CORRECTION

PATENT NO. : 12,267,137 B2  
APPLICATION NO. : 17/730676  
DATED : April 1, 2025  
INVENTOR(S) : Tosato et al.

Page 1 of 1

It is certified that error appears in the above-identified patent and that said Letters Patent is hereby corrected as shown below:

On the Title Page

Item (72), Inventors, Line 1, delete "Bures sur Yvette" and insert -- Bures-sur-Yvette --, therefor.

Signed and Sealed this  
Twenty-fourth Day of June, 2025

Coke Morgan Stewart  
*Acting Director of the United States Patent and Trademark Office*